(12) United States Patent
Bernhardsson

(10) Patent No.: US 9,110,955 B1
(45) Date of Patent: Aug. 18, 2015

(54) SYSTEMS AND METHODS OF SELECTING CONTENT ITEMS USING LATENT VECTORS

(71) Applicant: Spotify AB, New York, NY (US)

(72) Inventor: Erik Bernhardsson, New York, NY (US)

(73) Assignee: SPOTIFY AB, Stockholm (SE)

( * ) Notice: Subject to any disclaimer, the term of this patent is extended or adjusted under 35 U.S.C. 154(b) by 174 days.

(21) Appl. No.: 13/911,057

(22) Filed: Jun. 5, 2013

Related U.S. Application Data

(60) Provisional application No. 61/737,692, filed on Dec. 14, 2012, provisional application No. 61/657,637, filed on Jun. 8, 2012.

(51) Int. Cl.
*G06F 7/00* (2006.01)
*G06F 17/30* (2006.01)

(52) U.S. Cl.
CPC .................................. *G06F 17/3053* (2013.01)

(58) Field of Classification Search
CPC .......... G06F 17/3053; G06F 17/30595; G06F 17/30867; G06F 17/30663; G06F 17/30864
USPC ......................................................... 707/748
See application file for complete search history.

(56) References Cited

U.S. PATENT DOCUMENTS

| | | | | |
|---|---|---|---|---|
| 8,175,989 | B1 * | 5/2012 | Gopinath et al. ................ | 706/45 |
| 2002/0082901 | A1 * | 6/2002 | Dunning et al. ................ | 705/10 |
| 2009/0300547 | A1 * | 12/2009 | Bates et al. .................... | 715/825 |
| 2009/0313227 | A1 * | 12/2009 | Dunning et al. ................. | 707/3 |
| 2010/0169313 | A1 * | 7/2010 | Kenedy et al. ................ | 707/736 |
| 2010/0169340 | A1 * | 7/2010 | Kenedy et al. ................ | 707/758 |
| 2011/0040707 | A1 * | 2/2011 | Theisen et al. .................. | 706/12 |
| 2011/0153663 | A1 * | 6/2011 | Koren et al. ................... | 707/776 |
| 2012/0054238 | A1 * | 3/2012 | Lee et al. ...................... | 707/771 |
| 2012/0096352 | A1 * | 4/2012 | Maor et al. .................... | 715/706 |
| 2012/0131018 | A1 * | 5/2012 | Shishido et al. ............... | 707/748 |
| 2012/0143911 | A1 * | 6/2012 | Liebald et al. ................ | 707/771 |
| 2012/0330777 | A1 * | 12/2012 | Sathish et al. ................. | 705/26.7 |
| 2013/0018755 | A1 * | 1/2013 | Zhang ........................... | 705/26.7 |
| 2013/0073568 | A1 * | 3/2013 | Federov et al. ................ | 707/749 |

(Continued)

OTHER PUBLICATIONS

F. Aiolli. A Preliminary Study on a Recommender System for the Million Songs Dataset Challenge, Technical report, 2012, 4 pgs.

(Continued)

*Primary Examiner* — Robert Beausoliel, Jr.
*Assistant Examiner* — Nicholas Allen
(74) *Attorney, Agent, or Firm* — Morgan, Lewis & Bockius LLP

(57) ABSTRACT

A two-dimensional matrix of data points represents occurrences of users selecting content items, such as audio tracks. A server computes n-dimensional latent vectors for each user and for each item. The server iteratively optimizes the user vectors and item vectors based on the data points. Each iteration includes a first phase in which the item vectors are held constant, and a second phase in which the user vectors are held constant. In the first phase, the server computes first phase parameters based on data points, the user vectors, and the item vectors, and updates the user vectors. In the second phase, the server similarly computes second phase parameters for the item vectors and updates the item vectors. The server receives a request from a user for an item recommendation, and selects an item vector based on proximity in n-dimensional space. The server then recommends the selected item to the user.

16 Claims, 14 Drawing Sheets

(56) References Cited

U.S. PATENT DOCUMENTS

| 2013/0080371 | A1* | 3/2013 | Harber et al. | 706/50 |
|---|---|---|---|---|
| 2013/0124449 | A1* | 5/2013 | Pinckney et al. | 706/52 |
| 2013/0332842 | A1* | 12/2013 | Bernhardsson et al. | 715/738 |
| 2014/0181121 | A1* | 6/2014 | Nice et al. | 707/748 |

OTHER PUBLICATIONS

R. M. Bell, The BellKor solution to the Netflix Prize, AT&T Labs—(2007, as indicated on the attached Netflix Prize webpage) Research, 19 pgs.

T. Bertin-Mahieux, The Million Song Dataset. In ISMIR 2011: Proceedings of the 12th International Society for Music Information Retrieval Conference, Oct. 24-28, 2011, Miami, Florida, pp. 591-596. University of Miami, 2011, 6 pgs.

D. M. Blei, Latent Dirichlet Allocation. The Journal of Machine Learning Research, 2003, 30 pgs.

A. S. Das, Google News Personalization: Scalable Online Collaborative Filtering, In Proceedings of the 16th International Conference on World Wide Web, May 8-12, 2007, 10 pgs.

J. Dean, Large Scale Distributed Deep Networks, 2012, 11 pgs.

S. Deerwester, Indexing by Latent Semantic Analysis, Journal of the American society for Information Science, 1990, 17 pgs.

J. Duchi, Adaptive Subgradient Methods for Online Learning and Stochastic Optimization, Journal of Machine Learning Research, 2010, 39 pgs.

G. Hinton, Stochastic Neighbor Embedding, Advances in Neural Information Processing Systems, 2002, 8 pgs.

T. Hofmann, Probabilistic Latent Semantic Indexing, Proceedings of the Fifteenth Conference on Uncertainty in Artificial Intelligence, Morgan Kaufmann Publishers Inc., 1999, 8 pgs.

Y. Hu, Collaborative Filtering for Implicit Feedback Datasets. In Data Mining, 2008. ICDM'08. Eighth IEEE International Conference, 2008, 10 pgs.

S. Rendle, BPR: Bayesian Personalized Ranking from Implicit Feedback, In Proceedings of theTwenty-Fifth Conference on Uncertainty in Articial Intelligence, AUAI Press, 2009, 10 pgs.

R. Salakhutdinov, Probabilistic Matrix Factorization, Advances in Neural Information Processing Systems, 2008, 8 pgs.

H. Steck, Training and Testing of Recommender Systems on Data Missing Not at Random, In Proceedings of the 16th ACM SIGKDD International Conference on Knowledge Discovery and Data Mining, 2010, 10 pgs.

* cited by examiner

SYSTEMS AND METHODS OF SELECTING CONTENT ITEMS USING LATENT VECTORS

RELATED APPLICATIONS

This application claims priority to U.S. Provisional Application Ser. No. 61/737,692, filed Dec. 14, 2012, entitled "Systems and Methods for Implicit Probabilistic Matrix Factorization," and U.S. Provisional Application Ser. No. 61/657,637, filed Jun. 8, 2012, entitled "Playlist Generation and Analysis," both of which are incorporated by reference herein in their entirety.

TECHNICAL FIELD

The disclosed implementations relate generally to selecting appropriate content items, such as audio tracks and videos, using implicit vectors.

BACKGROUND

Historically, there have been two main ways to receive audio tracks. If a user purchases a physical medium that stores the audio tracks, then the user has complete control over what tracks to plan and when to plan them. However, a physical medium (such as a CD) has a fixed set of audio tracks, such as a specific "album" from a single artist. With more work, a user can "burn" additional physical media that have customized sequences of audio tracks. However, even with that work, the list is still fixed.

An alternative is to listen to audio tracks on a radio station. A radio station has a very large selection of audio tracks and can play those tracks in an endless variety of sequences. In addition, different radio stations can focus on different genres, enabling users to select the specific type of music desired (which can vary from day to day or from hour to hour). However, radio stations have a different set of problems. One problem is the abundance of commercials and other interruptions. A second problem is that the selected audio tracks may not be of interest to the listener. In fact, a user may strongly dislike some of the audio tracks that are played. A user can address these problems to some extent by switching the station or channel. However, the need to switch among multiple stations or channels may indicate that there is no station or channel that is a good match for a specific user's interests.

Some companies have addressed these problems by providing streaming content over the Internet. In some instances, a user searches for desired content items (e.g., audio tracks), and the desired content items are subsequently streamed to the user over a computer. Some websites provide Internet radio stations, which can be designated for a single individual or group of individuals. The Internet radio stations stream an endless sequence of content items, commonly without commercials. In addition, if a user does not want the current content item, the user can execute a "skip-forward," which prompts the Internet radio station to select and stream a new content item.

Despite the appeal of an Internet radio station as described, there are still problems. One problem is how to select content items that best represent what a user wants. This is particularly difficult when the Internet radio station has little information about a user's preferences. Furthermore, some users are reluctant to spend their time giving extensive information about their preferences.

In addition, many users like to listen to a radio station with a specific genre. Historically, a DJ or other individual would select content items corresponding to an identified "genre". However, different individuals may have different opinions, and some of those opinions may not correspond to what people expect. Also, even if there is common knowledge about the classification of some content items, it may not be possible to identify that common knowledge. As with personal preferences, users are typically reluctant to spend their time providing explicit feedback.

SUMMARY

Some implementations of the present invention address these and other problems. Some implementation offer a streaming music service based on search, play, and playlists. For instance, a user can type the name of an artist or track and search for it to find it. The user can then click the found track to play it. The user can repeat this process, finding and playing new tracks they recall.

Some implementations offer an online radio feature. This radio feature plays an endless sequence of songs. The user does not know which song will play next. If the user doesn't like the song currently playing, a "Skip" of "Skip Forward" button moves to the next song immediately. To create a new radio station, a user first identifies a "seed." This seed can be one or more individual tracks, one or more artists, one or more albums, one or more playlists, a music genre, or combinations of these. A software system "programs" the radio station, choosing which tracks to play dynamically. In some implementations, an Internet radio station is associated with a single user or user ID. In some implementations, Internet radio stations can be shared with other users. In some implementations, the selection criteria for an Internet radio station are based on input from two or more users.

Some implementations use the disclosed techniques to identify related artists or related items. For example, some implementations include a discover page in which a user can find additional content items of interest. In some implementations, new content items are recommended based on a user's previous history (e.g., what songs the user has previously listened to). In some implementations, a user can enter one or more content items or artists, and related artists or content items are identified for the user. In some implementations, both user history and currently identified items are used to make recommendations.

Some of the disclosed implementations use large scale collaborative filtering. Some implementations apply these algorithms to Internet radio stations. In particular, with millions of available content items, it would be very expensive (in time and resources) to compare each of the content items to all of the other content items. One alternative uses matrix factorization, or singular value decomposition (SVD). The idea is to create a usage matrix whose rows represent users and whose columns represent content items. In some implementations, each entry represents the number of times that a specific user selected a specific content item. It would be useful to express each entry in this matrix as a function of a user vector u and an item vector i (these are latent vectors). Although this cannot be done exactly, user and item vectors can be chosen so that the vector products approximate the entries in the usage matrix, up to a multiplicative constant.

Because the usage matrix is sparse, it is fairly easy to iteratively compute user and item vectors. For example, some implementations use about 20 iterations, which can occur in about 24 hours when distributed across many computers operating in parallel. Finding the user and item vectors factors the usage matrix into a product, which is a convenient representation. In some implementations, the user and item vectors contain around 40 elements, so multiplying vectors together is quick. Other implementations utilize latent vectors with more or fewer than forty elements.

In some implementations, the user and item vectors are viewed as points in hyperspace (e.g., with 40 dimensions). Using this representation, the proximity between two item vectors is just the angle between the vectors (or the cosine of the angle). If the item vecotrs are normalized to unit length, then the cosine of the angle is the inner product (or dot product) of two vectors. Alternatively, the cosine of the angle between item vectors $i_1$ and $i_2$ is $$\frac{\vec{i_1} \cdot \vec{i_2}}{\|\vec{i_1}\|\|\vec{i_2}\|}$$

Thus, the similarity between two content items has been reduced to a straightforward calculation.

Unfortunately, with even 5 million audio tracks and 5 million users, there are about 25 trillion possible user/item combinations. Some implementations address this problem by "cutting" the 40 dimensional vector space of items with random hyperplanes, creating a bunch of faceted regions. Additional hyperplanes are added until there are few enough points in each region so that it is possible to compare all the item vectors in each region with all the other item vectors in that region. Some implementations add hyperplanes until there are only a few hundred item vectors in each region. Depending on computing resources, the desired number of item vectors in each faceted region may be more or less than a few hundred.

A new method for latent non-negative matrix factorization is disclosed. This technique is used to make recommendations for users, such as audio tracks, musical artists, or videos. It is a collaborative filtering method that takes implicit data as input. It can be implemented efficiently as an iterative map/reduce job with linear complexity proportional to the input size.

Implementations enable content item providers to make high quality recommendations based on historical user data (data for all users, not just from the user seeking a recommendation). By observing patterns in past listening data, systems can provide personalized item recommendations.

A lot of attention has been given to collaborative filtering with explicit data, where users actively select ratings for items (e.g., rating movies with 1 to 5 stars). Disclosed implementations address a different problem: no explicit feedback from users, but an abundance of historical log data regarding which content items users have experienced (e.g., listened to, watched, played, etc.) Not only is it more difficult to work with such implicit data, but the sheer volume of the data makes it generally intractable for processing on a single computer or even a small number of computers.

In some implementations, the data set is the stream data, which includes all audio tracks that all users have streamed. Every time a user plays a track, it is logged.

In some implementations, some streams are omitted from the occurrence matrix 800. For example, some implementations omit all streams lasting less than 30 seconds. In some implementations, streams are omitted when the user did not listen to the end of the track. In some implementations, listening to the end of a track is considered only when the track is not too long (e.g., less than 5 minutes). Some implementations omit other streams as well, when they do not represent active usage by the end user. In some implementations, all users with less than a threshold activity are removed (e.g., those who have listened to fewer than 100 tracks). If there is not enough data for a user, then the data that does exist may not be representative of what the user likes. In some implementations, users with excessive activity are removed (e.g., those who have listened to more than 10,000 streams). Here, a user whose interests are too varied may not provide useful correlations. In some implementations, all tracks with less than minimum number of streams are removed (e.g., 400 streams).

There are multiple user facing features that can use recommendation data. Some of these features are "user-agnostic," requiring only a way to correlate items with each other. For example, with audio tracks the "user-agnostic" features include genre based Internet radio (e.g., identify more items that correlate with the items in the genre), related artists (e.g., find a artist whose work is similar to the work of another artist), similar tracks (e.g., find new tracks that are similar to tracks that a user likes), and so on.

In some implementations, the goal of a content provider is to increase the number of active users. In general, it is difficult or impossible to directly optimize the number of users. Instead, implementations typically focus on other measureable metrics, such as the number of "skip-forward" actions by users while listening to a stream of audio tracks; the length of time users interact with the provided content items; the number of "thumbs up" or "thumbs down" actions; and so on. Some of these proxy metrics are domain specific, such as "skip forward" actions while listening to an Internet radio.

An issue with some collaborative filtering algorithms for implicit data is that they focus on predicting future user events. A predictive model will have an inherent bias towards popular items because users are more likely to know about those items. There are also fewer popular items to choose from, meaning that the user is more likely to choose one of those specific items.

For example, one can predict that many (perhaps most) people will listen to Michael Jackson at some point, but this doesn't mean that Michael Jackson is a good recommendation for the majority of all users.

Another problem with measuring a model's strength in terms of its ability to predict is that the model includes the size of the set of items. For example, a user may listen to equal amounts of music from two classes of items that have different cardinality (i.e., one of the classes of music has more items than the other). An unsupervised model will assign lower likelihood to any item in the class with more items (more items to choose from, so each item is individually played fewer times).

In the disclosed implementations, each dimension for the latent vectors represents a latent "characteristic" of the users or items. The latent vectors for each user or item specify a quantity of each latent characteristic. This is similar to the RGB color system, in which each color in the spectrum is specified by the amounts of red, green, and blue. Of course, the latent vectors here have many more than three characteristics (e.g., 40), and there is no inherent meaning attached to the characteristics. The term "item" is a general term that can refer to audio tracks, albums, artists, videos, etc. In some implementations, occurrences of user/item pairs are assumed to be observations drawn independently and with replacement from a joint distribution over U×I, where U is the set of all users and I is the set of all items (e.g., audio tracks). In other implementations, there is a separate probability distribution for each user.

In accordance with some implementations, a method is performed at one or more servers. Each server has one or more processors and memory, and the memory stores one or more programs for execution by the processors. The method uses a two-dimensional matrix of data points, where each data point represents occurrences of a respective user selecting a respective item (such as an audio track, video, or musical artist). Each respective user corresponds to a user identifier in a set of identified users and each respective item corresponds to an item identifier in a set of identified items. The method computes n-dimensional latent vectors corresponding to each of the users and items, where n is a positive integer (e.g., 40 or 50). The method allocates memory for respective latent user vectors corresponding to each respective user identifier in the set of identified users, and for respective latent item vectors corresponding to each respective item identifier in the set of identified items. In some implementations, the processing is spread across a plurality of computers, in which case memory is allocated accordingly. The method initializes the components of each latent user vector and each latent item vector. In some implementations, the initialization uses randomly generated values. The method iteratively optimizes the user vectors and item vectors based on the data points in the two dimensional matrix as well as the current values for the user and item vectors. Each iteration includes a first phase in which the component values of the item vectors are held constant, and a second phase in which the component values of the user vectors are held constant. In the first phase, the method computes a plurality of first phase parameters for each user vector based on data in the two-dimensional matrix, the user vectors, and the item vectors, and then updates the component values for each user vector using the first phase parameters. In the second phase, the method computes a plurality of second phase parameters for each item vector based on data in the two-dimensional matrix, the user vectors, and the item vectors, and updates the component values for each item vector using the second phase parameters.

Subsequently, a request is received from a user for an item recommendation. In some instances, the user corresponds to a user vector $u_0$. The method selects an item for the user based, at least in part, on the latent user and item vectors. In some implementations, the method selects an item vector $i_0$ for which the inner product of $u_0$ and $i_0$ is greater than the inner product of $u_0$ and i for most of the item vectors i. The method then recommends to the user the item corresponding to the item vector $i_0$, and sends the recommendation to the user. In other implementations, one or more items that the user likes are known (e.g., by explicit feedback, or interacting with the item multiple times). The method selects another item that is close to one of the known desirable items by computing inner products of latent item vectors. The "close" item is then recommended to the user.

In some implementations, the respective first phase parameters for each respective user vector u include a respective gradient vector $d_u$ with n component values, wherein $d_u$ specifies the direction to modify u in order to optimize the user vector u.

In some implementations, updating the component values for each user vector using the first phase parameters includes replacing each respective user vector u with $u+\alpha(d_u/|d_u|)$, where $\alpha$ is a monotonically decreasing function of the iteration step and $|d_u|$ is the length of the vector $d_u$. Other implementation options for updating the user vectors u based on the gradient vectors $d_u$ are described below.

In some implementations, the respective second phase parameters for each respective item vector i include a respective gradient vector $h_i$ with n component values, wherein $h_i$ specifies the direction to modify i in order to optimize the item vector i.

In some implementations, updating the component values for each item vector using the second phase parameters comprises replacing each respective item vector i with $i+\beta(h_i/|h_i|)$, where $\beta$ is a monotonically decreasing function of the iteration step and $|h_i|$ is the length of the vector $h_i$. Other implementation options for updating the item vectors i based on the gradient vectors $h_i$ are described below.

In some implementations, $\exp(u \cdot i)$ is used to estimate the probability of the user corresponding to user vector u selecting the item corresponding to item vector i. In some implementations, $\exp(u \cdot i)$ is the probability, up to a constant of proportionality. Because $\exp( )$ is a monotonically increasing function, some implementations use $u \cdot i$ when comparing probabilities.

In some implementations, computing the plurality of first phase parameters includes: sharding the set of user identifiers and the set of item identifiers into a plurality of non-overlapping shards; computing partial first phase parameters for each of the plurality of shards; and computing at least a subset of the first phase parameters by summing corresponding partial first phase parameters.

In some implementations, computing the plurality of first phase parameters includes: computing a sampled first phase parameter using data from a proper subset of the item vectors; and estimating a first phase parameter corresponding to the sampled first phase parameter by multiplying the sampled first phase parameter by a scaling factor corresponding to the fraction of item vectors sampled.

BRIEF DESCRIPTION OF THE DRAWINGS

Like reference numerals refer to corresponding parts throughout the drawings.

DESCRIPTION OF IMPLEMENTATIONS

Figure 1:
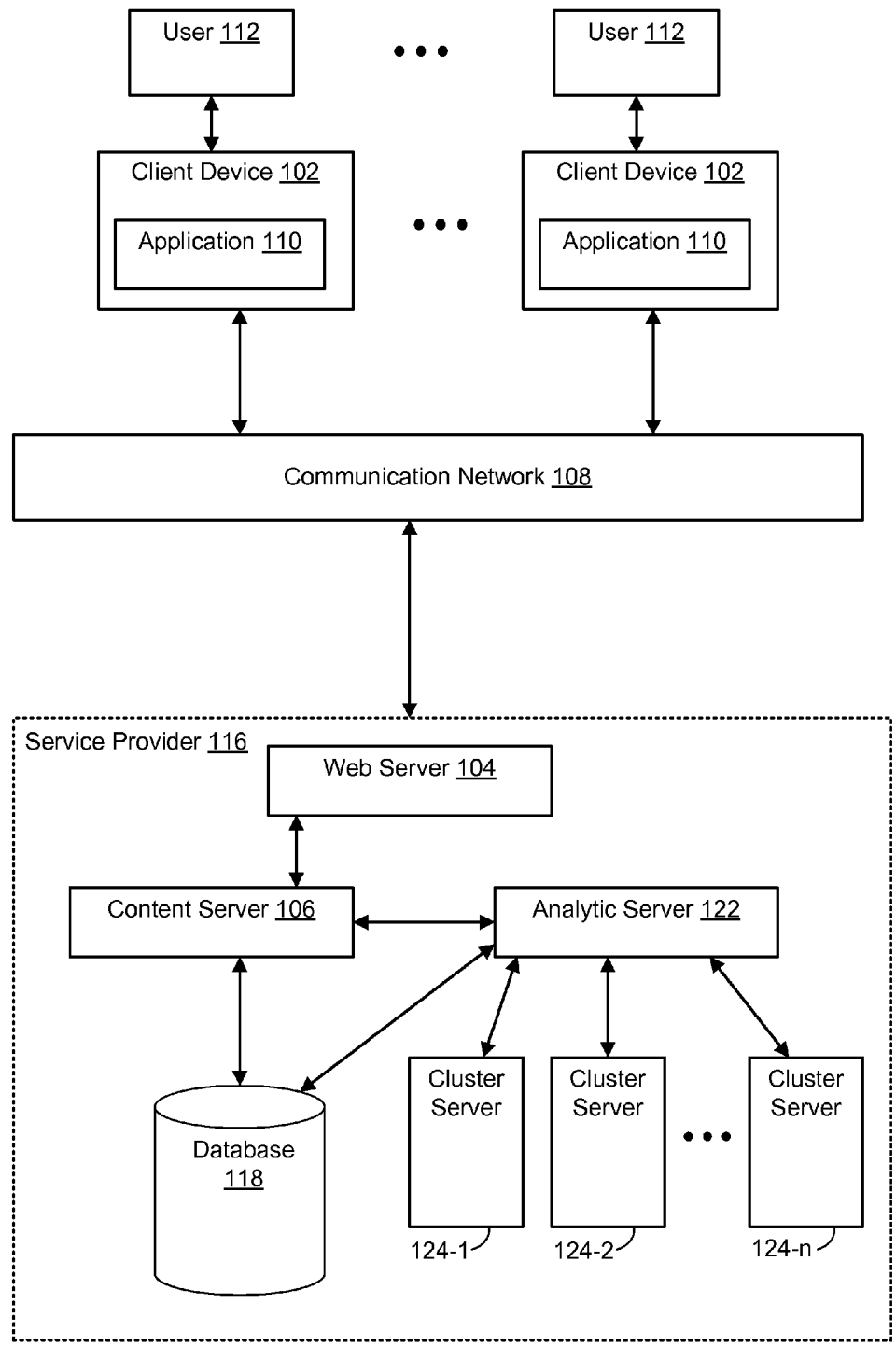
FIG. 1 illustrates the context in which some implementations of the present invention operate.

FIG. 1 illustrates the context in which some implementations of the present invention operate. A plurality of users 112 access their client devices 102 to run an application 110, which accesses content items provided by the service provider 116. In some implementations, the application 110 runs within a web browser 224. The application 110 communicates with the service provider 116 over a communication network 108, which may include the Internet, other wide areas networks, one or more local networks, metropolitan networks, or combinations of these. The service provider 116 works with the application 110 to provide users with content items, such as audio tracks or videos. The service provider typically has one or more web servers 104, which receive requests from client devices 102, and provide content items, web pages, or other resources in response to those requests. The service provider also includes one or more content servers 106, which select appropriate content items for users. The data used by the content servers 106 is typically stored in a database 118, including content items 324 and associated metadata, as described below with respect to FIG. 3. In some implementations, the database 118 is stored at one or more of the content servers 106. In some implementations, the database is a relational SQL database. In other implementations, the data is stored as files in a file system or other non-relational database management system.

The client device 102 includes an application 110, such as a media player that is capable of receiving and displaying/playing back audio, video, images, and the like. The client device 102 is any device or system that is capable of storing and presenting content items to a user. For example, the client device 102 can be a laptop computer, a desktop computer, tablet computer, mobile phone, television, etc. Moreover, the client device 102 can be part of, or used in conjunction with, another electronic device, such as a set-top-box, a television, a digital photo frame, a projector, a smart refrigerator, or a "smart" table.

In some implementations, the client device 102, or an application 110 running on the client device 102, requests web pages or other content from the web server 104. The web server 104, in turn, provides the requested content to the client device 102.

The content items 324 stored in the database 118 include audio tracks, images, videos, etc., which are sent to client devices 102 for access by users 112. For example, in implementations where the application 110 is a media player, the application 110 may request media content items, and the service provider 116 sends the requested media content items to the client device 102.

In some implementations, an analytic server 122 uses the access log 346 to construct an occurrence matrix 800, as described below. Using this data, the analytic server 122 computes latent user and item vectors, which is later used to make item recommendations. In some implementations, the analytic server 122 distributes the processing across many individual cluster servers 124 (e.g., servers 124-1, 124-2, ..., 124-n). In some implementations, the distribution of processing uses a map/reduce algorithm.

Figure 2:
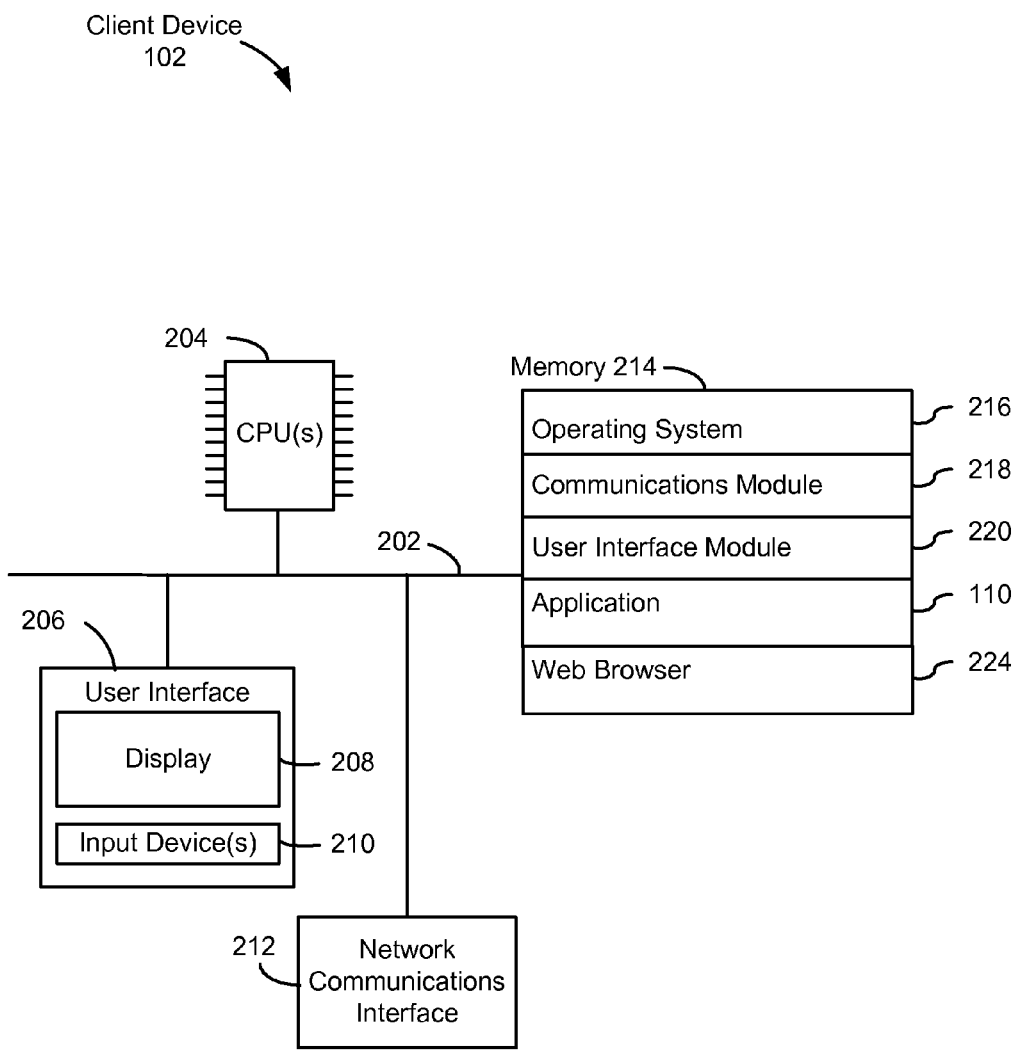
FIG. 2 is a block diagram illustrating a client device in accordance with some implementations.

FIG. 2 is a block diagram illustrating a client device 102 according to some implementations. The client device 102 typically includes one or more processing units (CPUs, sometimes called processors) 204 for executing programs (e.g., programs stored in memory 214), one or more network or other communications interfaces 212, user interface components 206, memory 214, and one or more communication buses 202 for interconnecting these components. The communication buses 202 may include circuitry (sometimes called a chipset) that interconnects and controls communications between system components. In some implementations, the user interface 206 includes a display 208 and input device(s) 210 (e.g., keyboard, mouse, touchscreen, keypads, etc.). In some implementations, the client device 102 is any device or system that is capable of storing and presenting content items to a user. In some implementations, the client device 102 is a mobile device, including, but not limited to, a mobile telephone, audio player, laptop computer, handheld or tablet computer, portable digital assistant, or the like. In some implementations, the client device 102 is a desktop (i.e., stationary) computer. In some implementations, the client device is, or is incorporated into, a set-top-box, a television, a digital photo frame, a projector, a smart refrigerator, a "smart" table, or a media player accessory.

Memory 214 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 214 optionally includes one or more storage devices remotely located from the CPU(s) 204. Memory 214, or alternately the non-volatile memory devices(s) within memory 214, comprises a non-transitory computer readable storage medium. In some implementations, memory 214 or the computer readable storage medium of memory 214 stores the following programs, modules, and data structures, or a subset thereof:

- an operating system 216, which includes procedures for handling various basic system services and for performing hardware dependent tasks;
- a communications module 218, which connects the client device 102 to other computers (e.g., the web server 104, the content server 106, etc.) via the one or more communication interfaces 212 (wired or wireless) and one or more communication networks 108, such as the Internet, other wide area networks, local area networks, metropolitan area networks, and so on;
- a user interface module 220, which receives commands from the user via the input device(s) 210 and generates user interface objects in the display device 208;
- an application 110 (e.g., a media player, a game, etc.), which provides one or more computer-based functions to a user; and
- a web browser 224, which allows a user to access web pages and other resources over the web. In some implementations, the application 110 runs within the web browser 224.

The application 110 is any program or software that provides one or more computer-based functions to a user. In some implementations, the application is a media player. In some implementations, the application is a computer game. The application 110 may communicate with the web server 104, the content server 106, as well as other computers, servers, and systems.

In some implementations, the programs or modules identified above correspond to sets of instructions for performing a function or method described above. The sets of instructions can be executed by one or more processors (e.g., the CPUs 204). The above identified modules or programs (i.e., sets of instructions) need not be implemented as separate software programs, procedures, or modules, and thus various subsets of these programs or modules may be combined or otherwise re-arranged in various implementations. In some implementations, memory 214 stores a subset of the modules and data structures identified above. Furthermore, memory 214 may store additional modules and data structures not described above.

Figure 3:
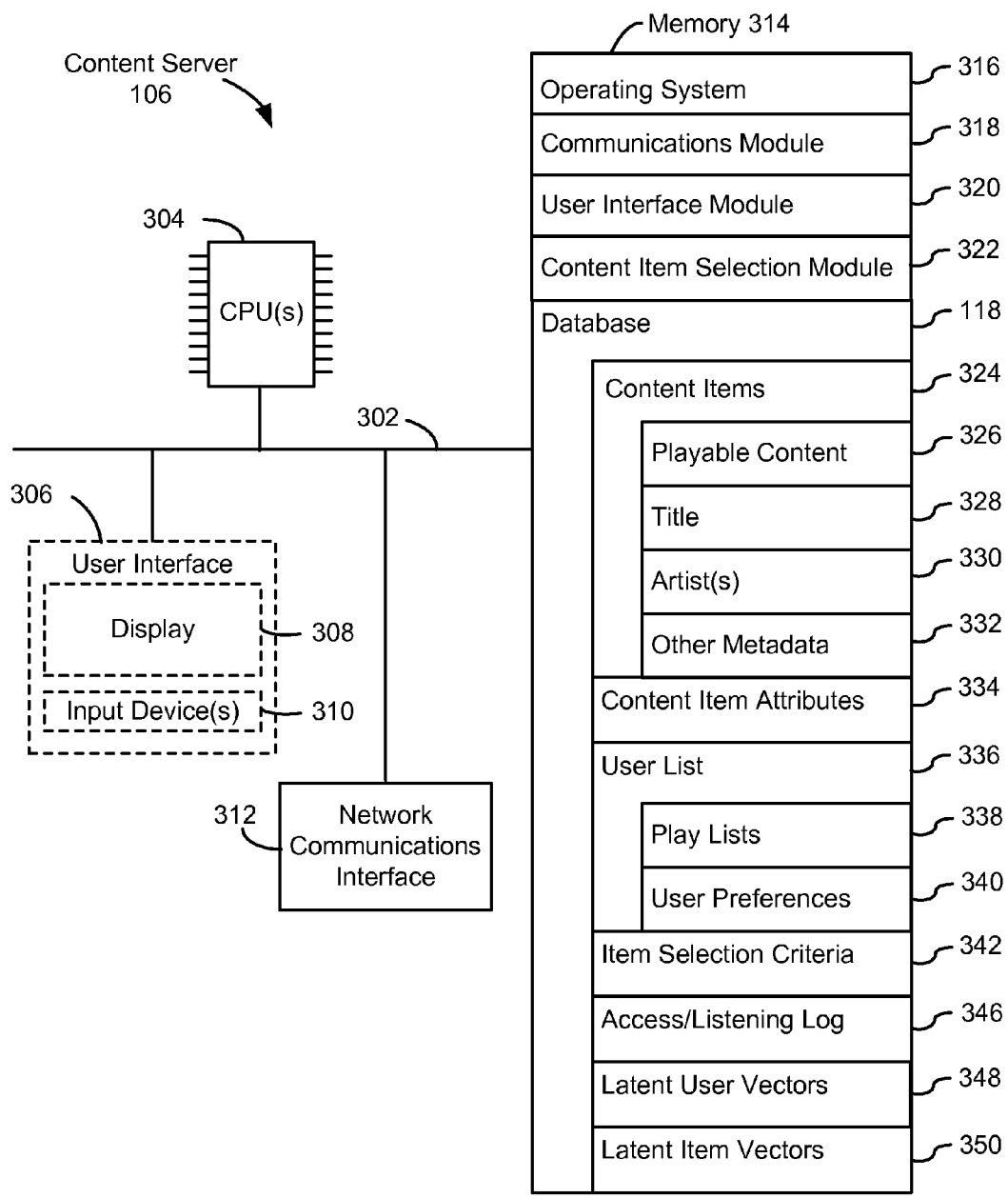
FIG. 3 is a block diagram illustrating a content server in accordance with some implementations.

FIG. 3 is a block diagram illustrating a content server 106 according to some implementations. The content server 106 typically includes one or more processing units (CPUs, sometimes called processors) 304 for executing programs (e.g., programs stored in memory 314), one or more network or other communications interfaces 312, an optional user interface 306, memory 314, and one or more communication buses 302 for interconnecting these components. The communication buses 302 may include circuitry (sometimes called a chipset) that interconnects and controls communications between system components. In some implementations, the user interface 306 includes a display 308 and input device(s) 310 (e.g., keyboard, mouse, touchscreen, keypads, etc.).

Memory 314 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 314 optionally includes one or more storage devices remotely located from the CPU(s) 304. Memory 314, or alternately the non-volatile memory devices(s) within memory 314, comprises a non-transitory computer readable storage medium. In some implementations, memory 314 or the computer readable storage medium of memory 314 stores the following programs, modules, and data structures, or a subset thereof:

- an operating system 316, which includes procedures for handling various basic system services and for performing hardware dependent tasks;
- a communications module 318, which connects the content server 106 to other computers (e.g., the client device 102, the web server 104, etc.) via the one or more communication interfaces 312 (wired or wireless) and one or more communication networks 108, such as the Internet, other wide area networks, local area networks, metropolitan area networks, and so on;
- an optional user interface module 320, which receives commands via the input device(s) 310 and generates user interface objects in the display device 308;
- a content item selection module 322, which selects content items 324 for individual users and/or for Internet radio stations based on one or more criteria;
- a database 118, which stores content items 324 and other data used by the content item selection module 322 and other modules running on the content server 106. Each content item 324 includes both the playable content 326 (e.g., the actual audio track or video), as well as metadata about the content item 324. The metadata includes the title 328 of the content item 324, the name(s) 330 of the artists or group (e.g., singer, band, actor, movie producer), and other metadata 332. The database also includes a list or table of content item attributes 334, such as genres (e.g., "hip-hop," "jazz," "rock") or themes (e.g., "Christmas" or "Hanukkah"). The database 118 also includes a list of users 336, who are typically registered users. This allows the content server to track the likes and dislikes of the users, and thus present users with content items 324 that better match a user's likes. In some implementations, the database stores playlists 338 for each user, which are lists of content items 324. A playlist may be completely constructed by the user, or partially constructed by a user and filled in by the content item selection module 322 (e.g., by identifying items similar to or correlated with content items already in the playlist). An individual user may have zero or more playlists. Some implementations store user preferences 340 provided by each user. When provided, user preferences may enable the content item selection module 322 to provide better content item selections. The database also stores item selection criteria 342. In some implementations, the criteria are stored for each individual user separately. Some implementations enable multiple sets of selection criteria for an individual user (e.g., for a user who likes to listen to both jazz and classical music, but at different times). Some implementations support group selection criteria, which can be used independently or in conjunction with personal item selection criteria;
- the database 118 also stores an access log 346, which tracks occurrences of users accessing individual content items 324. Typically, there is a record for each individual occurrence, which can be a user listening to an audio track, a user watching a video, etc. In some implementations, each record in the access log 346 identifies the user, the item accessed, the date/time of the access, whether the item was accessed completely (e.g., not skipped), the device used for the access, and so on;
- the database 118 stores latent user vectors 348, which identify each user in an n-dimensional vector space. The components of the user vectors do not correspond to any predetermined characteristics; and
- the database 118 stores latent item vectors 350, which identify each item in the same n-dimensional vector space as the latent user vectors. Although the components of the item vectors do not correspond to any predefined characteristics, the user and item vectors are effectively measured by the same n latent characteristics.

In some implementations, content items 324 are audio tracks, videos, images, interactive games, three-dimensional environments, or animations.

In some implementations, the programs or modules identified above correspond to sets instructions for performing a function or method described above, including those described above. The sets of instructions can be executed by one or more processors (e.g., the CPUs 304). The above identified modules or programs (i.e., sets of instructions) need not be implemented as separate software programs, procedures, or modules, and thus various subsets of these programs or modules may be combined or otherwise re-arranged in various implementations. In some implementations, memory 314 stores a subset of the modules and data structures identified above. Furthermore, memory 314 may store additional modules and data structures not described above.

Figure 4:
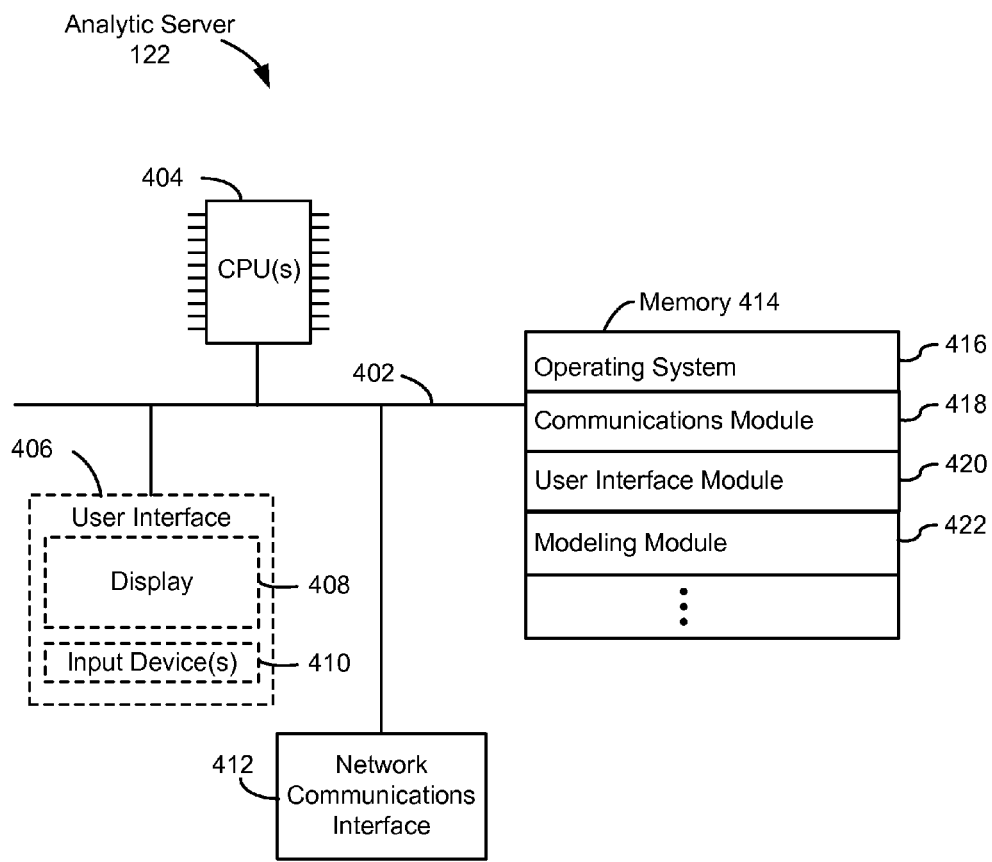
FIG. 4 is a block diagram illustrating an analytic server in accordance with some implementations.

FIG. 4 is a block diagram illustrating an analytic server 122 according to some implementations. The analytic server 122 typically includes one or more processing units (CPUs, sometimes called processors) 404 for executing programs (e.g., programs stored in memory 414), one or more network or other communications interfaces 412, an optional user interface 406, memory 414, and one or more communication buses 402 for interconnecting these components. The communication buses 402 may include circuitry (sometimes called a chipset) that interconnects and controls communications between system components. In some implementations, the user interface 406 includes a display 408 and input device(s) 410 (e.g., keyboard, mouse, touchscreen, keypads, etc.).

Memory 414 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 414 optionally includes one or more storage devices remotely located from the CPU(s) 404. Memory 414, or alternately the non-volatile memory devices(s) within memory 414, comprises a non-transitory computer readable storage medium. In some implementations, memory 414 or the computer readable storage medium of memory 414 stores the following programs, modules, and data structures, or a subset thereof:

- an operating system 416, which includes procedures for handling various basic system services and for performing hardware dependent tasks;
- a communications module 418, which connects the analytic server 122 to other computers (e.g., the content server 106, etc.) via the one or more communication interfaces 412 (wired or wireless) and one or more communication networks 108, such as the Internet, other wide area networks, local area networks, metropolitan area networks, and so on;
- an optional user interface module 420, which receives commands via the input device(s) 410 and generates user interface objects in the display device 408;
- a modeling module 422, which utilizes the historical data in the access log 346 to predict which items 324 a user 112 will like. In some implementations, the analytic server 122 uses a plurality of cluster servers 124 in order to distribute processing tasks and thus greatly reduce the overall processing time.

In some implementations, the programs or modules identified above correspond to sets instructions for performing a function or method described above. The sets of instructions can be executed by one or more processors (e.g., the CPUs 404). The above identified modules or programs (i.e., sets of instructions) need not be implemented as separate software programs, procedures, or modules, and thus various subsets of these programs or modules may be combined or otherwise re-arranged in various implementations. In some implementations, memory 414 stores a subset of the modules and data structures identified above. Furthermore, memory 414 may store additional modules and data structures not described above.

Figure 5:
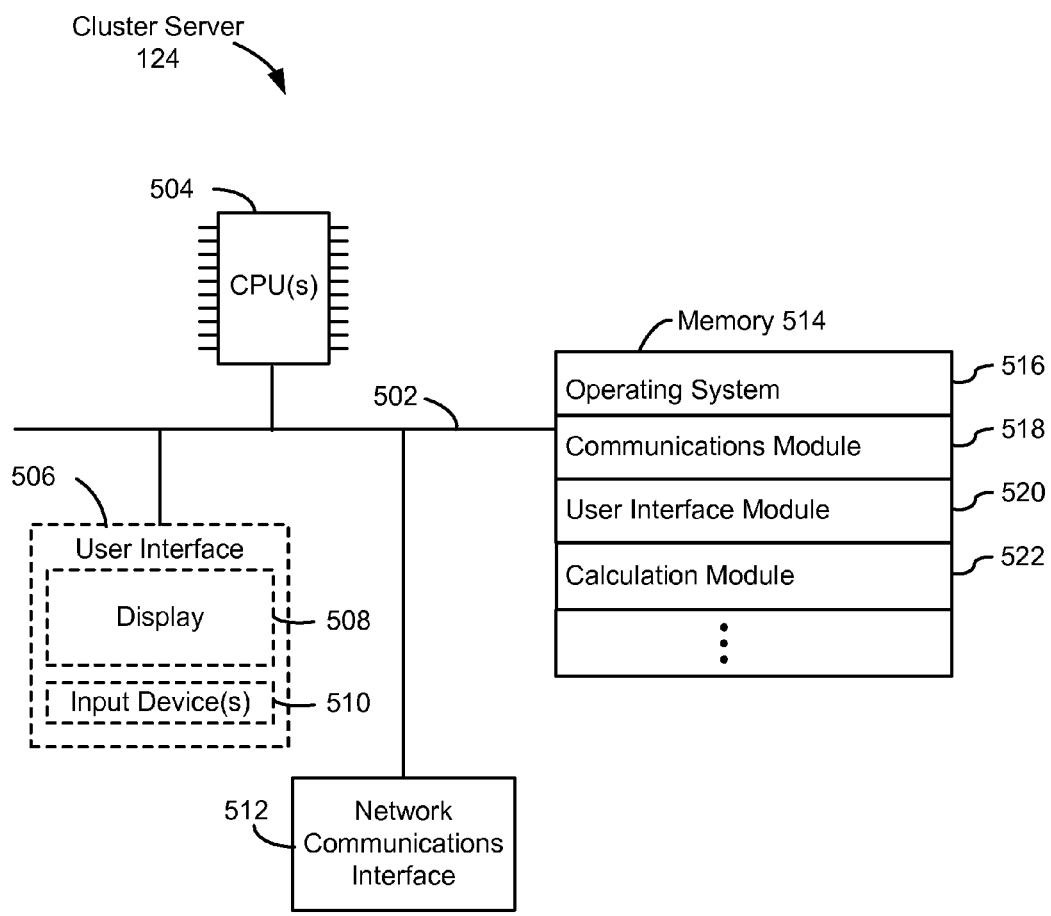
FIG. 5 is a block diagram illustrating a cluster server in accordance with some implementations.

FIG. 5 is a block diagram illustrating a cluster server 124 according to some implementations. The cluster server 124 typically includes one or more processing units (CPUs, sometimes called processors) 504 for executing programs (e.g., programs stored in memory 514), one or more network or other communications interfaces 512, an optional user interface 506, memory 514, and one or more communication buses 502 for interconnecting these components. The communication buses 502 may include circuitry (sometimes called a chipset) that interconnects and controls communications between system components. In some implementations, the user interface 506 includes a display 508 and input device(s) 510 (e.g., keyboard, mouse, touchscreen, keypads, etc.).

Memory 514 includes high-speed random access memory, such as DRAM, SRAM, DDR RAM or other random access solid state memory devices; and typically includes non-volatile memory, such as one or more magnetic disk storage devices, optical disk storage devices, flash memory devices, or other non-volatile solid state storage devices. Memory 514 optionally includes one or more storage devices remotely located from the CPU(s) 504. Memory 514, or alternately the non-volatile memory devices(s) within memory 514, comprises a non-transitory computer readable storage medium. In some implementations, memory 514 or the computer readable storage medium of memory 514 stores the following programs, modules, and data structures, or a subset thereof:

- an operating system 516, which includes procedures for handling various basic system services and for performing hardware dependent tasks;
- a communications module 518, which connects a cluster server 124 to other computers (e.g., the analytic server 122, etc.) via the one or more communication interfaces 512 (wired or wireless) and one or more communication networks 108, such as the Internet, other wide area networks, local area networks, metropolitan area networks, and so on;
- an optional user interface module 520, which receives commands via the input device(s) 510 and generates user interface objects in the display device 508;
- a calculation module 522, which receives calculation tasks from the analytic server 122, performs the desired calculations, and returns the results to the analytic server 122. In some implementations, the calculation module 522 retrieves data from the database 118, including the access log 346. In some implementations, multiple instances of the calculation module 522 run simultaneously on the same cluster server 124.

In some implementations, the programs or modules identified above correspond to sets instructions for performing a function or method described above, including those described above. The sets of instructions can be executed by one or more processors (e.g., the CPUs 504). The above identified modules or programs (i.e., sets of instructions) need not be implemented as separate software programs, procedures, or modules, and thus various subsets of these programs or modules may be combined or otherwise re-arranged in various implementations. In some implementations, memory 514 stores a subset of the modules and data structures identified above. Furthermore, memory 514 may store additional modules and data structures not described above.

Although FIGS. 2-5 show client and server computers, these figures are intended more as functional descriptions of the various features that may be present in these computers than as structural schematics of the implementations described herein. In practice, and as recognized by those of ordinary skill in the art, items shown separately could be combined and some items could be separated. For example, some items shown separately in FIGS. 2-5 could be implemented in single modules or data structures.

Figure 6:
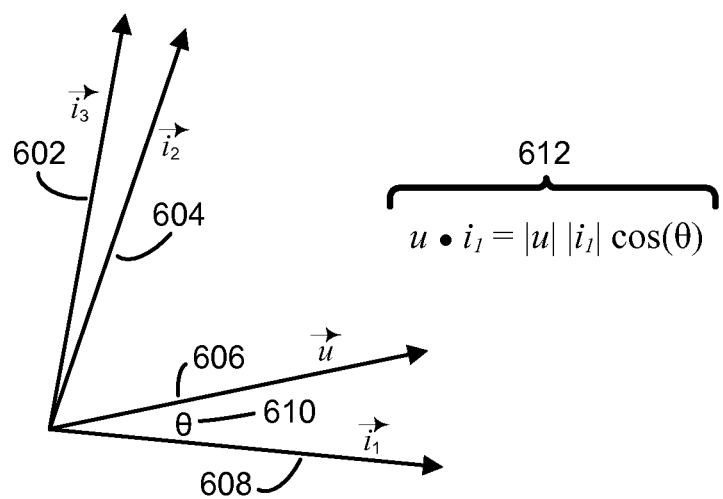
FIG. 6 illustrates geometrically user and item vectors, and the angles between them in accordance with some implementations.

FIG. 6 illustrates geometrically a user vector 606, and three item vectors 602, 604, and 608. Although depicted here in two dimensions, the vectors may have any number of components (e.g., 20 dimensions, 40 dimensions, or 100 dimensions). In FIG. 6, the angle between the user vector 606 and item vector $i_1$ is $\theta$ 610. As known in the art, the inner product (or dot product) of two vectors is the product of their lengths times the cosine of the angle between the vectors, as illustrated in the formula 612. Assuming $i_1$, $i_2$, and $i_3$ in FIG. 6 are item vectors 350 corresponding to content items 324, the items most similar to each other are $i_2$ and $i_3$ because they are the closest together. If a user likes item $i_2$, then there is a reasonable chance the user will also like $i_3$, but interest in $i_1$, is less likely.

Figure 7:
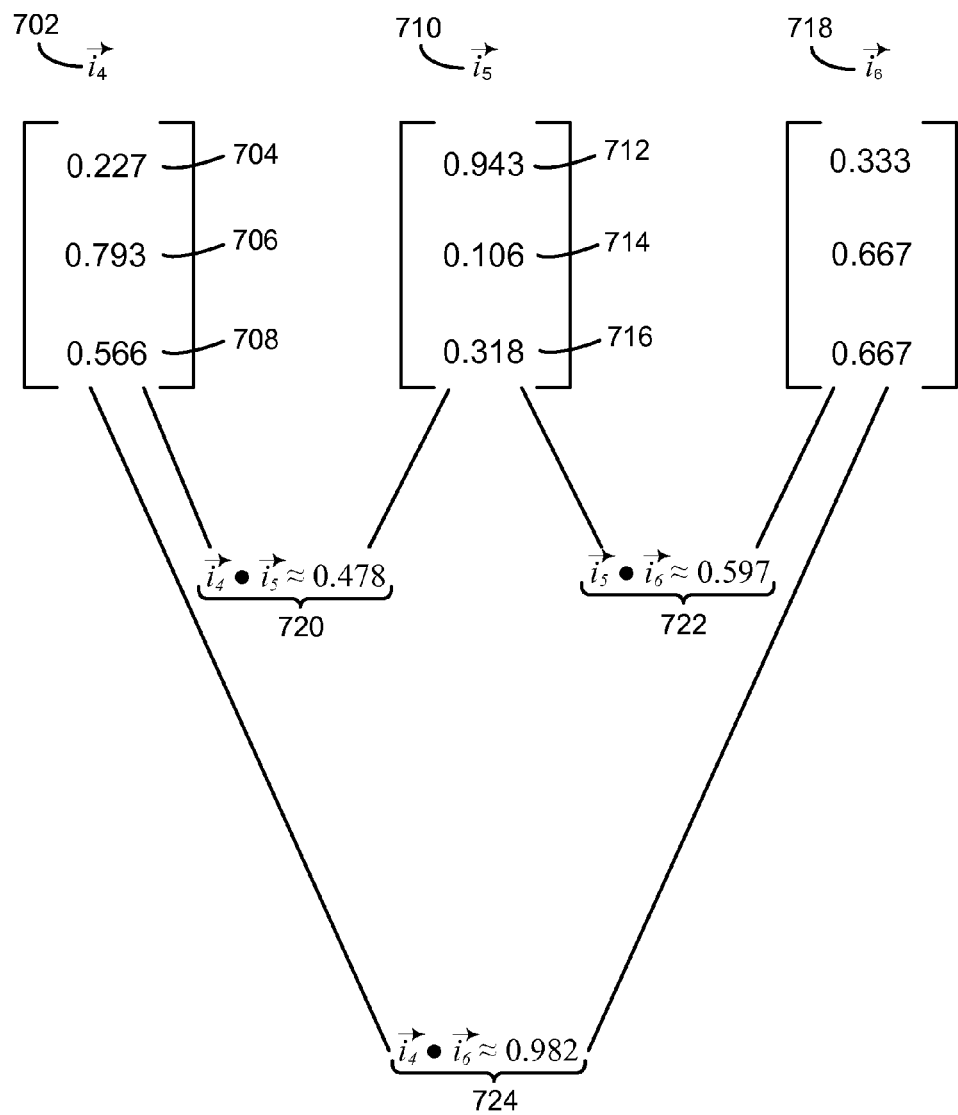
FIG. 7 illustrates algebraically item vectors and computing the proximity of those vectors in accordance with some implementations.

FIG. 7 illustrates three vectors $i_4$ 702, $i_5$ 710, and $i_6$ 718 algebraically. In this example, the vectors are shown with only three components, but a typical implementation would construct latent vectors with 30 or 40 components. The first vector 702 has components 704, 706, and 708, the second vector 710 has components 712, 714, and 716. When the vectors are expressed algebraically, the inner product of two vectors is the sum of the products of the individual components, and is commonly referred to as the dot product. For example, the inner product 720 $i_4 \cdot i_5 = (0.227*0.943) + (0.793*0.106) + (0.566*0.318)$, which is approximately 0.478. Similarly, the inner product 722 $i_5 \cdot i_6 = (0.943*0.333) + (0.106*0.667) + (0.318*0.667)$, which is approximately 0.597. Finally, the inner product 724 $i_4 \cdot i_6 = (0.227*0.333) + (0.793*0.667) + (0.566*0.667)$, which is approximately 0.982. In this example, the lengths of the vectors have been normalized to 1 (e.g., $(0.227)^2 + (0.793)^2 + (0.566)^2 \approx 1$). In this way, the inner products between pairs of vectors correspond to the angles. Therefore, it is apparent that vectors 702 and 718 are the closest pair of vectors. FIG. 7 also illustrates how easy it is computationally to compute the inner product of two vectors when their components are known. Even if the vectors have 40 or 50 components, an ordinary computer (e.g., content server 106 or cluster server 124) can compute an inner product almost instantaneously.

Figure 8:
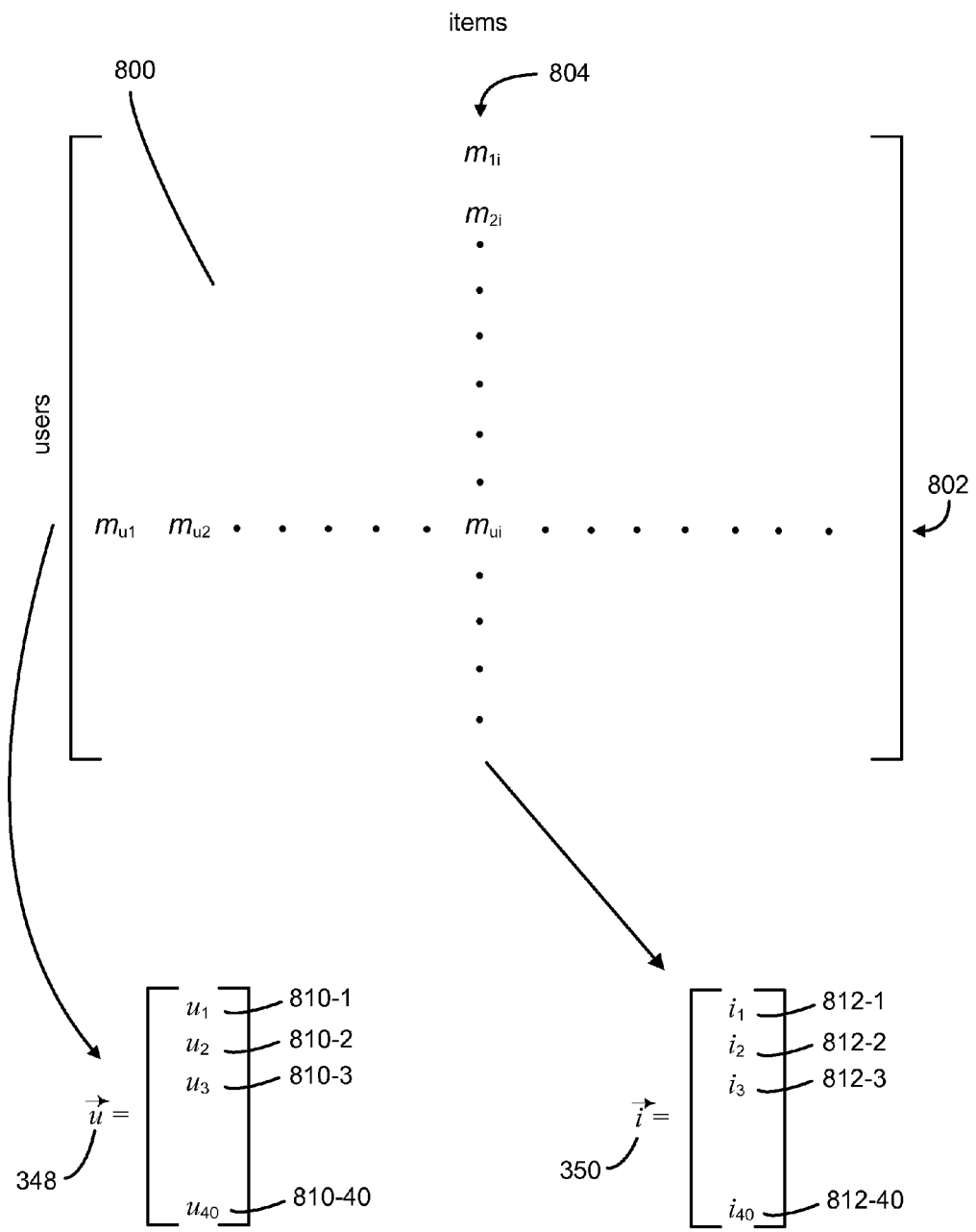
FIG. 8 illustrates an occurrence or usage matrix and corresponding latent user and item vectors in accordance with some implementations.

FIG. 8 illustrates an occurrence matrix 800, which is sometimes referred to as a usage matrix. In the illustrated implementation, each row represents a user, and each column represents an item. An item may be an audio track, a video, a musical artist, a musical genre, a video game, etc. Typically the occurrence matrix has millions of rows and millions of columns, and each entry represents the number of times that the corresponding user listened/viewed/played the corresponding item. In some implementations, each entry represents the length of time that the user interacted with the item rather than a count of the number of times. In some implementations, other metrics are used to quantify the interactions. Each user typically interacts with only a small percentage of the available items, so most of the entries in the matrix 800 are zero (e.g., 99.99% of the entries are zero).

In matrix 800, the row 802 for user u and the column 804 for item i are illustrated. The entry $m_{ui}$ indicates the number of times that user u selected/listened to/viewed/played item i (or other metric measuring the interaction of user u with item i). The row 802 has as many entries as there are items (e.g., 5 million), and the column 804 has as many entries as there are users (e.g., 10 million). These rows and columns have millions of entries, and most of the entries are zero. Disclosed implementations model this matrix 800 by using a vector space with a small number of dimensions. In the illustrated example, there are 40 dimensions, but other models could use fewer or more dimensions (e.g., 30, 50, or 75). Each user row and item column is assumed to correspond to a latent vector in this vector space. For example, user u corresponds to user vector $\vec{u}$ 348 with 40 components 810-1, 810-2, 810-3, ..., 810-40. Similarly, item i corresponds to item vector $\vec{i}$ 350 with 40 components 812-1, 812-2, 812-3, ..., 812-40. Note that the user vectors and item vectors are in the same vector space, so computing the inner product of any two vectors (user or item vectors) measures the proximity of the vectors. This was illustrated above with respect to FIGS. 6 and 7.

In this model, each of the vector components can be considered a latent characteristic of the users and items. For example, if the items are musical audio tracks, it is useful to imagine categorizing the audio tracks based on the 40 latent characteristics. If a user likes a particular audio track with latent item vector $\vec{i}$, then the user will probably like other audio tracks whose latent vectors are close to item vector $\vec{i}$.

Disclosed implementations provide methods for estimating the latent user vectors 348 and latent item vectors 350. The goal is to find a set of latent vectors that best corresponds to the occurrence matrix 800. The process is iterative, and in each iteration the process uses the current user and item vector estimates to compute a new set of estimates. The iterative process can continue as long as necessary, and typically stops when the marginal improvement between successive iterations is small. Because the process involves a substantial amount of data, most of the operations are distributed across multiple computers operating in parallel (e.g, using cluster servers 124).

Figure 9:
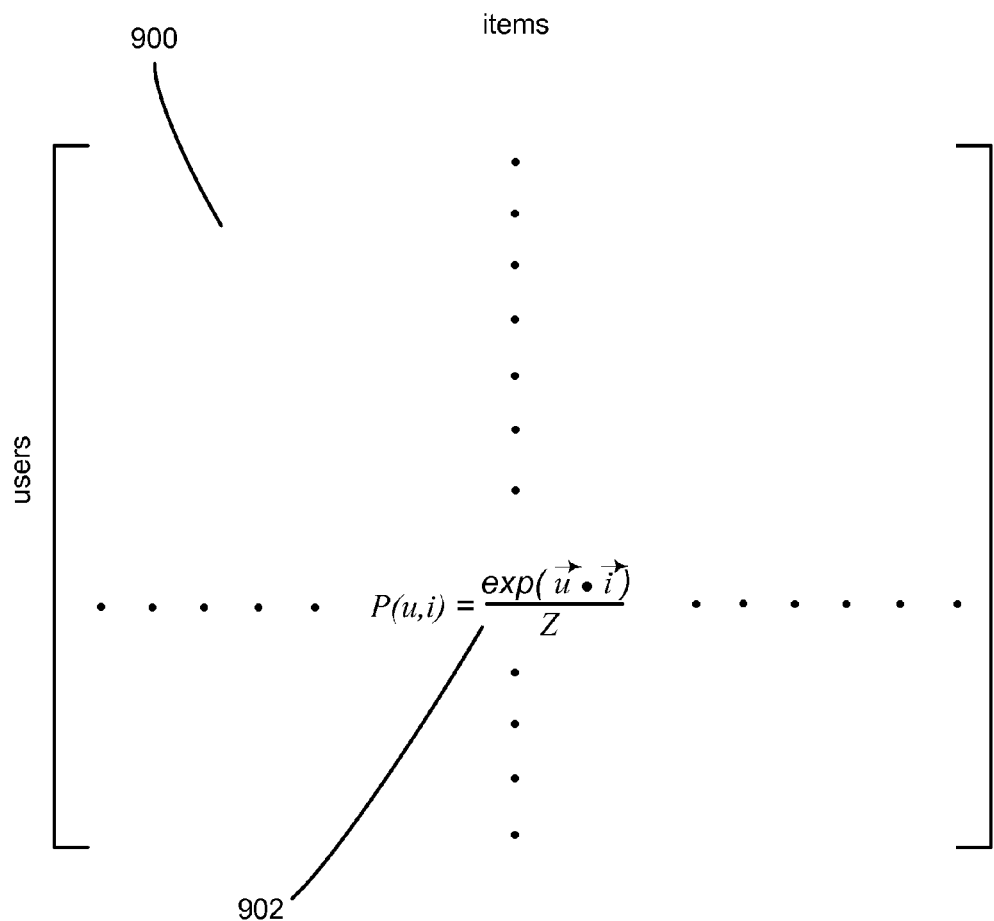
FIG. 9 illustrates a two-dimensional probability distribution corresponding to the occurrence matrix in FIG. 8 in accordance with some implementations.

Some implementations use a probability model, and assume that for user u and item i, the probability of user u selecting item i is $$P(u, i) = \frac{\exp(\vec{u} \cdot \vec{i})}{Z},$$

as illustrated by element 902 in FIG. 9. The function exp( ) is the exponential function and Z is a normalization factor. Because P(u,i) is a probability distribution, $\Sigma_{u,i} P(u,i) = 1$, so $Z = \Sigma_{u,i} \exp(\vec{u} \cdot \vec{i})$, as illustrated by equation 904 in FIG. 9. In FIG. 9, the matrix 900 is a probability distribution over both users and items, and the user and item vectors 348 and 350 are computed so that the probability distribution corresponds to the occurrence matrix 800 as closely as possible. Other implementations replace $$\frac{\exp(\vec{u} \cdot \vec{i})}{Z}$$

with $f(\vec{u} \cdot \vec{i})$, where $f$ is an alternative function. When such an alternative function is used, $f$ is typically required to be both positive and monotonically increasing. In some implementations, $f$ is assumed to be differentiable, or to have a smooth derivative.

Figure 10:
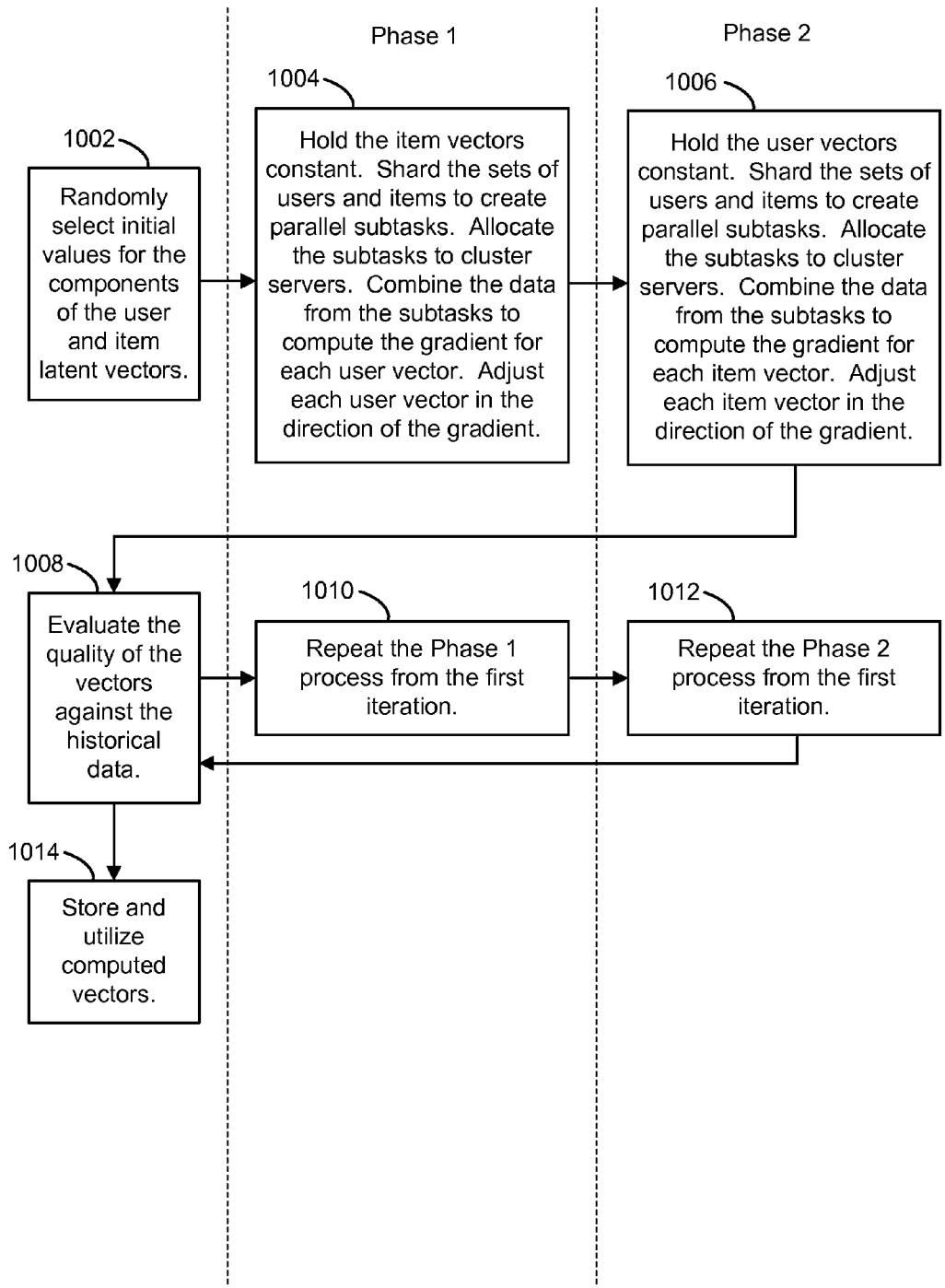
FIG. 10 illustrates a process flow for iteratively computing latent user and items vectors in accordance with some implementations.
Figure 11A:
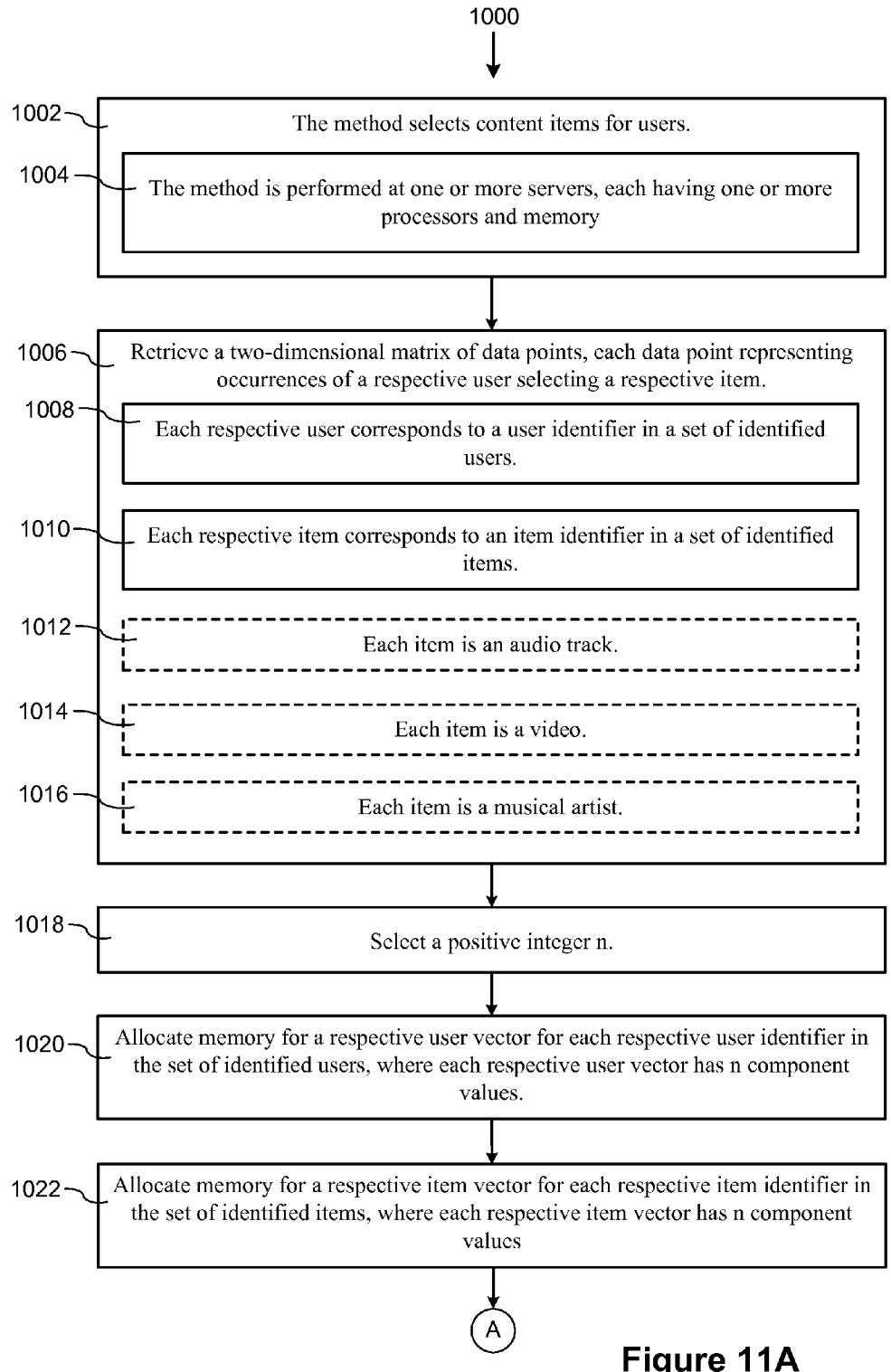
FIGS. 11A-11D are a flowchart of a method for computing latent user and item vectors, and using those latent vectors to provide item recommendations in accordance with some implementations.
Figure 11B:
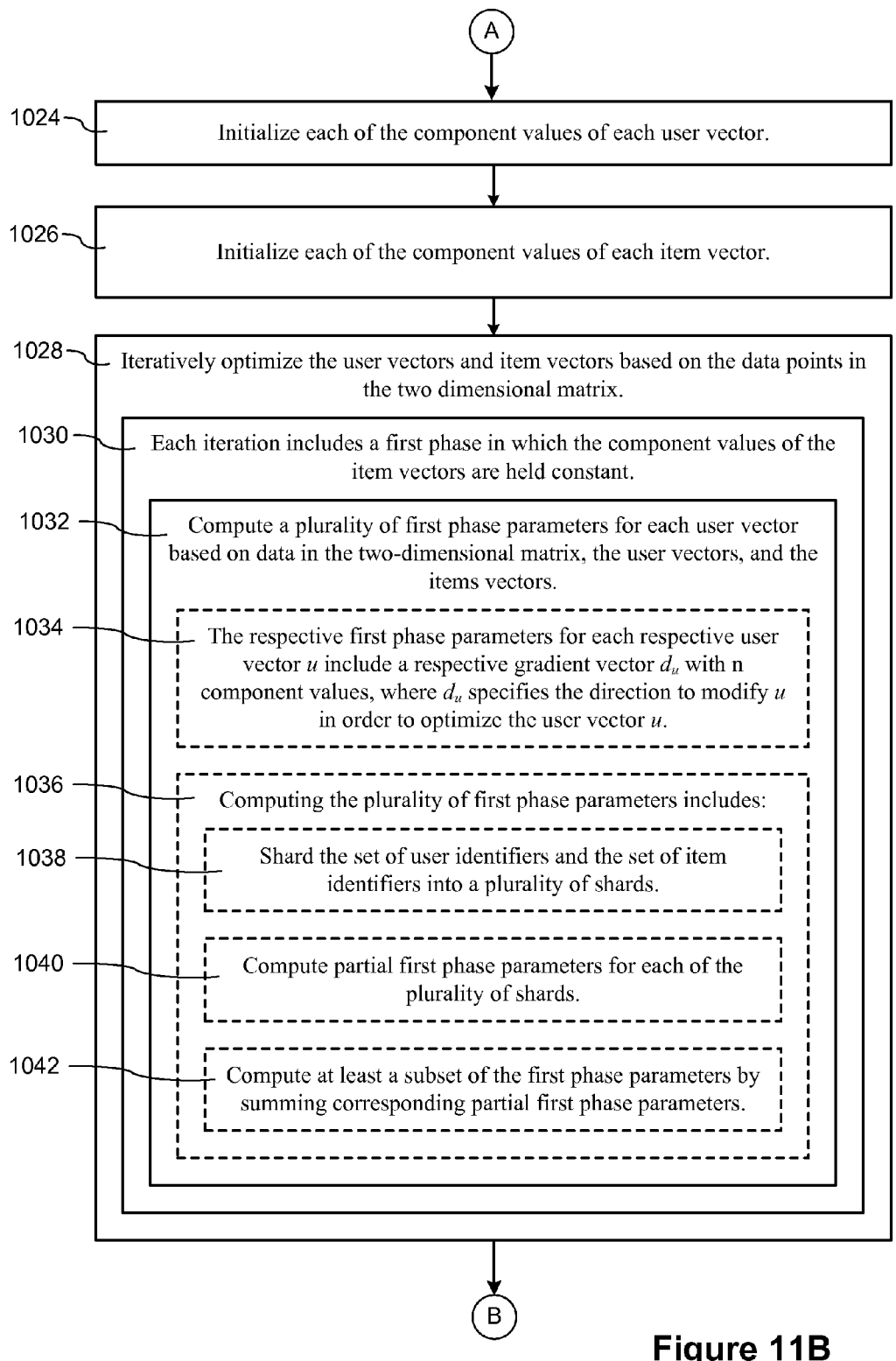
Figure 11C:
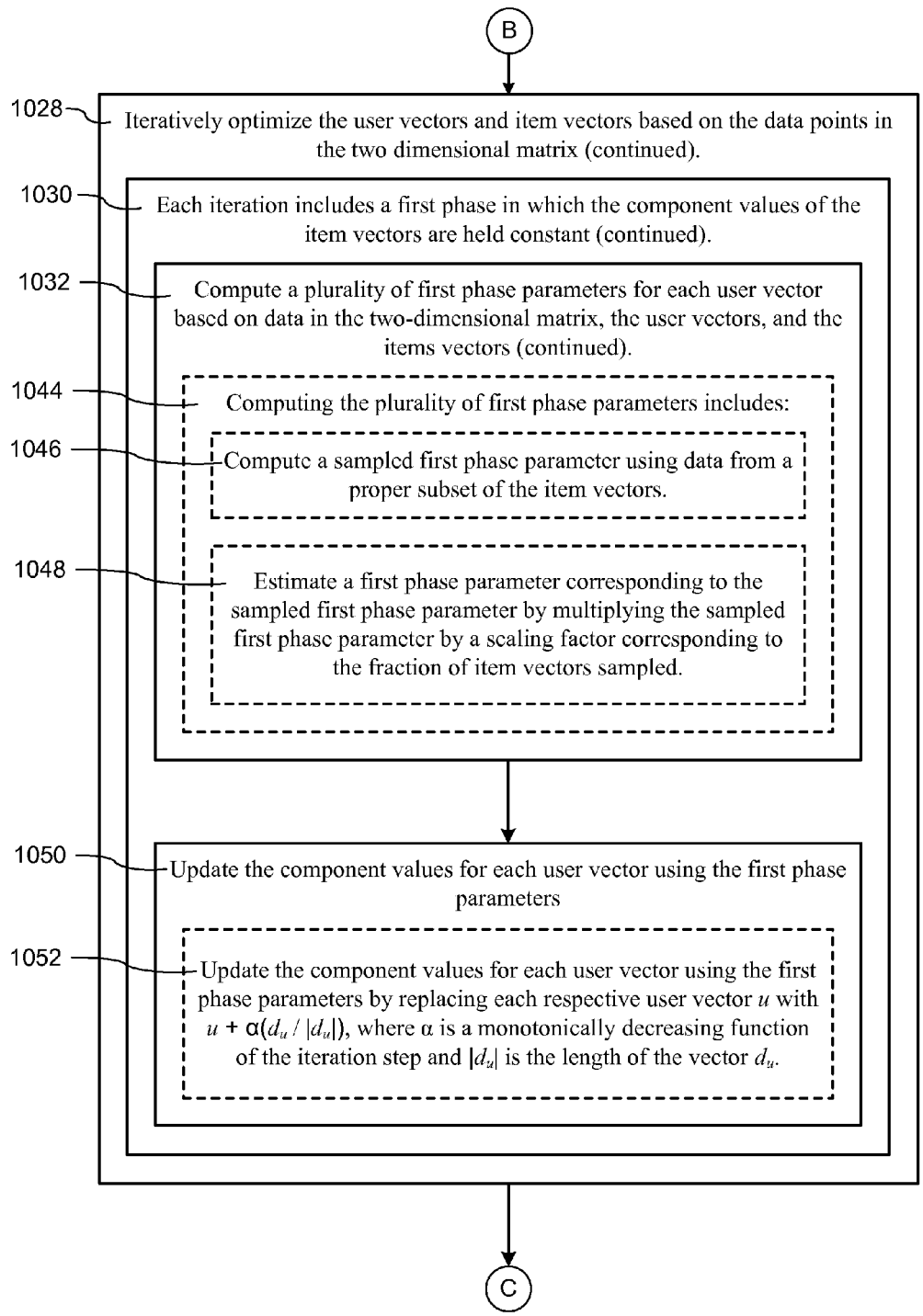
Figure 11D:
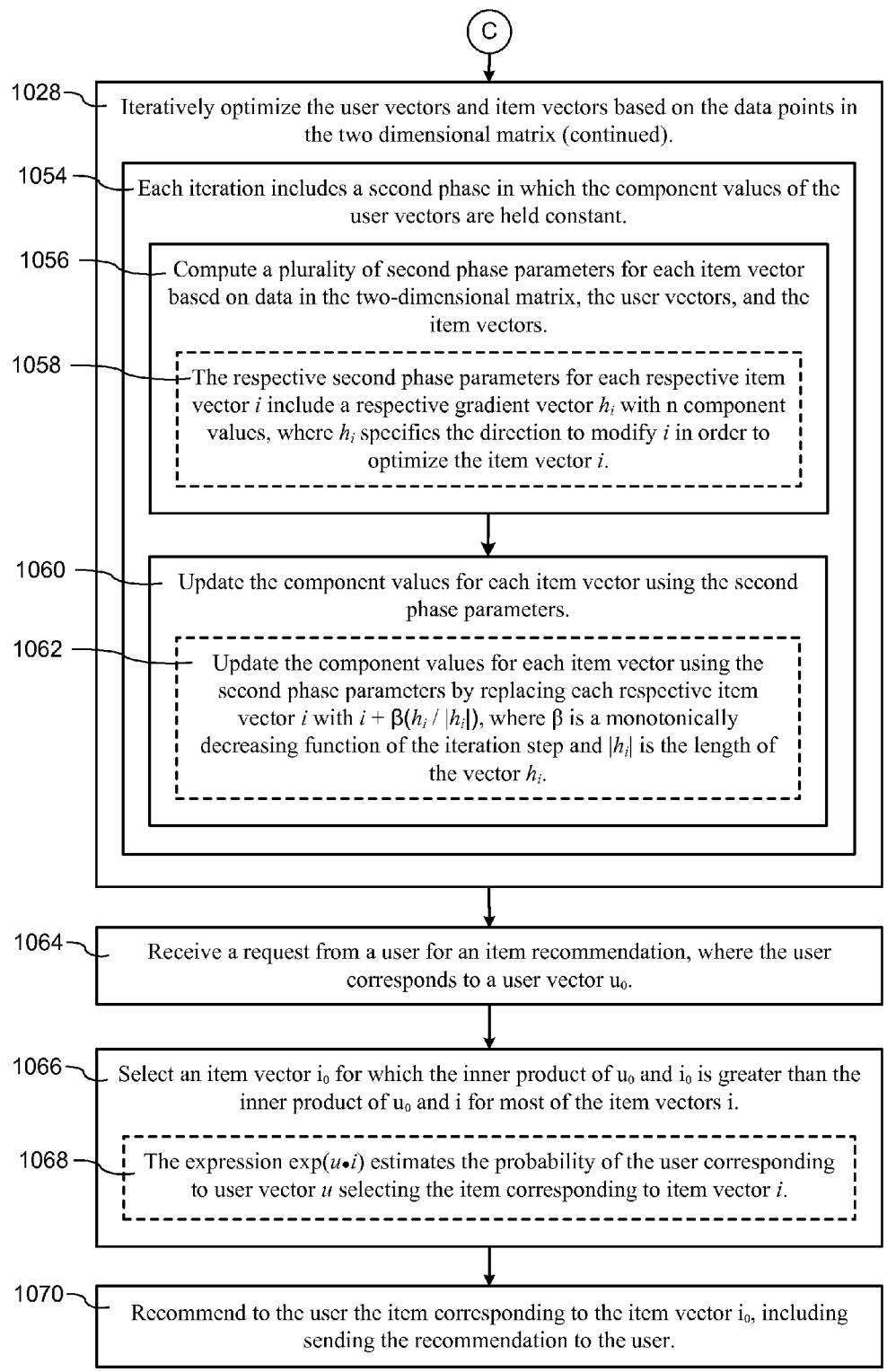

FIG. 10 illustrates a process for computing latent user and item vectors 348 and 350 in accordance with some implementations. The process begins by selecting (1002) initial values for the components of the user and item latent vectors 348 and 350. Typically, the initial values are assigned randomly, but some implementations may use initial values from a previous execution of the algorithm. For example, the algorithm could run once a month, and the final data from one month could be used as the input for the next month. In this case, there may be some new users and/or items, so the components of the latent vectors for the new users and items would be assigned randomly.

The algorithm proceeds iteratively, and each iteration has two phases. In the first phase, the current values of the item vectors are held (1004) constant. As noted previously, there are commonly millions of users, so the analytic server 122 shards (1004) the sets of users and items to create parallel subtasks that can be distributed to a plurality of cluster servers 124. Some implementations have a few hundred cluster servers 124. In some implementations there are fewer cluster servers (e.g., 20), and in other implementations there are more cluster servers (e.g., 1000). The analytic server 122 allocates (1004) the subtasks to the cluster servers 124. When the cluster servers 124 have completed their tasks, the analytic server 122 combines (1004) the data from the subtasks to compute an estimated gradient for each user vector. The gradient for each user vector indicates the direction to adjust the user vector so that the probability distribution matrix 900 best estimates the occurrence matrix 800. The analytic server adjusts (1004) each user vector in the direction of the gradient. The computation of the gradient for each user vector is based on the data in the occurrence matrix 800, the current values of the user vectors 348, and the current values of the item vectors 350.

When the first phase of an iteration is complete, the roles of the user vectors 348 and item vectors 350 are reversed. That is, the user vectors 350 are held (1006) constant while the algorithm computes adjustments for the item vectors. As in the first phase, the process shards (1006) the sets of users and items to create parallel subtasks. In some implementations, the sharding is done one time, and the same shards are then used for all subsequent phases and iterations. The analytic server 122 allocates (1006) the subtasks to cluster servers 124. When the cluster servers 124 have completed their tasks, the analytic server 122 combines (1006) the data from the subtasks to compute the gradient for each item vector. The gradient for each item vector indicates the direction to adjust the item vector so that the probability distribution matrix 900 best estimates the occurrence matrix 800. The analytic server 122 then adjusts (1006) each item vector in the direction of the gradient.

At the end of each iteration, the analytic server 122 evaluates (1008) the quality of the user and item vectors 348 and 350 against the historical data in the occurrence matrix 800. When the quality is satisfactory, the analytic server 122 stores (1014) the computed vectors in the database 118, and subsequent requests for item recommendations can utilize (1014) the stored user and item vectors. If the quality is not adequate, the algorithm performs another iteration, which repeats (1010) the phase 1 process and repeats (1012) the phase 2 process, both of which were described above.

In some implementations, the algorithm repeats for a predetermined number of iterations (e.g., 20, 30, or 40). Other implementations utilize a termination condition. For example, some implementations terminate the algorithm when the marginal adjustments fall below a threshold magnitude. Some implementations utilize a termination condition, but also limit the number of iterations.

FIGS. 11A-11D provide a flowchart for a method 1000 of selecting (1002) content items 324 for users 112. The method is performed (1004) at one or more servers, each having one or more processors and memory. The memory stores one or more programs for execution by the one or more processors. In some implementations, the method is performed by a modeling module 422 at an analytic server 122 and calculation modules 522 at a plurality of cluster servers 124.

The analytic server 122 retrieves (1006) a two-dimensional matrix 800 of data points, where each data point represents occurrences of a respective user selecting a respective item. In some implementations, there are several million users (e.g., 10 million) and several million items (e.g., 5 or 6 million). In some implementations, each item is (1012) an audio track. In some implementations, each item is (1014) is a video. In some implementations, each item is (1016) is a musical artist. Note that the same log data 346 can be used to generate more than one type of occurrence matrix 800. For example, for users listening to recorded music, the log data 346 could be used to build an occurrence matrix 800 of listening to individual audio tracks, or an occurrence matrix 800 of users listening to specific musical artists. The same disclosed methods can be applied to either of these occurrence matrices 800.

Each user has (1008) a corresponding user identifier (e.g., a user ID), and each item has (1010) a corresponding item identifier (e.g., and item ID). Because names of people are not necessarily unique, and titles of songs or videos do not necessarily identify unique recordings, the user ID's and item ID's are typically used as the unique identifiers for the users and items.

The method selects (1018) a positive integer n, which is the number of components for the latent vectors 348 and 350. In some implementations, the integer n is preselected by the software, so that the same integer n is used each time the method processes. In some implementations, the positive integer n is a configurable parameter. The process allocates (1020) memory for latent user vectors 348 for each of the users, and allocates (1022) memory for latent item vectors 350 for each of the items. Each of the latent vectors has n component values. In some implementations, the allocated memory comprises storage space in database 118. In some implementations, the allocated memory comprises volatile or non-volatile memory at the analytic server 122 and/or the cluster servers 124. In some implementations, the allocated memory comprises storage in one or more file servers or storage in a storage area network (SAN). The component values of the user vectors are initialized (1024) and the component values of the item vectors are initialized (1026) as well. In some implementations, the component values of the latent vectors are initialized as the space is allocated. In other implementations, the storage space is allocated in bulk, whereas the initialization of component values is done individually. In some implementations, the initial component values are assigned randomly or pseudo-randomly. In some implementations, the initialization of component values is non-random, but well distributed (e.g., not setting all component values to 1). In some implementations, the initialized vectors are normalized to have length 1.

After initializing the latent vectors, the method iteratively optimizes (1028) the user vectors and item vectors based on the data points in the two dimensional occurrence matrix 800. As explained above with respect to FIGS. 8-10, the user vectors and item vectors are adjusted so that the probability distribution matrix 900 best correlates with the occurrence matrix 800. Each iteration includes (1030) a first phase in which the component values of the item vectors are held constant. In the first phase, the method 1000 computes (1032) a plurality of first phase parameters for each user vector based on data in the two-dimension matrix 800, the current values of the user vectors 348, and the current values of the item vectors 350.

In some implementations, the respective first phase parameters for each respective user vector u include (1034) a respective gradient vector $d_u$ with n component values. The vector $d_u$ specifies the direction to modify u in order to optimize the user vector u.

In some implementations, the calculations are distributed across a plurality of cluster servers 124 by the analytic server 122. For example, some implementations utilize 200 cluster servers or 2000 cluster servers. In some of these implementations, computing the plurality of first phase parameters includes (1036) sharding (1038) the set of user identifiers and the set of item identifiers into a plurality of shards. For example, each shard may include 1000 user identifiers and 1000 item identifiers (1 million user/item combinations). Assuming that roughly 0.01% of the entries are non-zero, a shard with 1 million entries would have only 100 non-zero entries, which is easily manageable. The shards form a partition of the occurrence matrix 800, and there are commonly more shards than cluster servers 124. Therefore, each cluster server processes shards until they are all done. For each shard, a cluster server 124 computes (1040) partial first phase parameters for each of the user identifiers in the shard using the data for the corresponding users and items. An exemplary algorithm for computing partial first phase parameters is shown in the Sample Implementation later in the specification. After all of the partial first phase parameters are computed, the analytic server 122 computes (1042) at least a subset of the first phase parameters by summing corresponding partial first phase parameters.

In some implementations, even parallel processing is very time consuming. To address this issue, some implementations compute (1044) at least a subset of the first phase parameters by computing (1046) sampled first phase parameters using data from a proper subset of the item vectors. Then, the method estimates (1048) the first phase parameters corresponding to the sampled first phase parameters by multiplying each sampled first phase parameter by a scaling factor corresponding to the fraction of item vectors sampled. For example, a certain first phase parameter for a single user may require a calculation that involves all of the latent item vectors 350 (e.g., 5 million vectors, each with 40 components). Rather than perform the millions of arithmetic operations (for each individual user), some implementations randomly sample perhaps 5000 of those item vectors, to compute a sampled first phase parameter x. Because only 1/1000 of the item vectors were sampled, the estimated first phase parameter is 1000x, scaled to accommodate the sampling.

Some implementations use both sharding and sampling. In this case, the calculations by a cluster server 124 for an individual shard results in some partial sampled first phase parameters. The analytic server 122 combines the partial calculations from the individual shards to compute corresponding sampled first phase parameters. Then the analytic server scales the sampled first phase parameters corresponding to the amount of sampling in order to compute the final first phase parameters.

Using the first phase parameters, the analytic server 122 updates (1050) the component values for each of the user vectors. In some implementations where the first phase parameters include the gradient $d_u$ for each user vector, the component values for each user vector are updated (1052) by replacing each respective user vector u with $u+\alpha(d_u/|d_u|)$. Here, $|d_u|$ is the length of the vector $d_u$. In some implementations, $\alpha$ is a monotonically decreasing positive function of the iteration step. In some implementations, $\alpha$ approaches 0. For example, in some implementations $\alpha=1/t$, where t is the iteration step.

Each iteration also includes (1054) a second phase in which the component values of the user vectors are held constant. The previous discussion with respect to the first phase applies equally to the second phase, but with the roles of the user and item vectors reversed. The analytic server 122 and cluster servers 124 compute (1056) a plurality of second phase parameters for each item vector based on data in the two dimensional occurrence matrix 800, the current values of the user vectors, and the current values of the item vectors. In some implementations, the respective second phase parameters for each respective item vector i include (1058) a respective gradient vector $h_i$ with n component values, where $h_i$ specifies the direction to modify i in order to optimize the item vector i.

After the second phase parameters are computed for each item vector, the component values for each item vector are updated (1060) based on the second phase parameters. In some implementations, each respective item vector i is replaced (1062) with $i+\beta(h_i/|h_i|)$, where $\beta$ is a monotonically decreasing function of the iteration step and $|h_i|$ is the length of the vector $h_i$. In some implementations, $\beta$ approaches 0. For example, in some implementations $\beta=1/t$, where t is the iteration step.

The iterative process repeats, and the user and item vectors converge to their final state. The process may repeat for 20, 30, 40, or more iterations. In some implementations, the iterative process stops when sufficient convergence is detected (e.g., the marginal benefit of additional iterations is lower than the processing cost for those additional iterations). In some implementations, the process stops after a fixed number of iterations. For example, some implementations stop after 30 iterations. In some implementations, the number of iterations is configurable.

The latent user vectors 348 and latent item vectors 350 are stored for later use, such as in the database 118. Later, the latent user and item vectors 348 and 350 are used to make item recommendations. A request for an item recommendation is received (1064) from a user 112. In some implementations, the user 112 corresponds to a latent user vector $u_0$ 348. In some cases, the user 112 does not correspond to stored latent user vector 348 (e.g., a new user). In some implementations, the content item selection module 322 selects (1066) an item vector $i_0$ for which the inner product of $u_0$ and $i_0$ is greater than the inner product of $u_0$ and i for most of the item vectors i. In some implementations, the expression $\exp(u \cdot i)$ estimates (1068) the probability of the user 112 corresponding to user vector u selecting the item corresponding to item vector i (up to a constant of proportionality). In some implementations, the content item selection module 322 identifies an item that the user 112 likes (e.g., from the access log 346, user preferences 340), and uses that information to estimate one or more other items that the user might like. For example, if it is known that the user 112 likes the item corresponding to item vector $i_1$, some implementations identify another latent item vector $i_0$ that is close to $i_1$ in the latent vector space (see FIGS. 6 and 7).

The method then recommends (1070) to the user 112 the item corresponding to the item vector $i_0$ 350, including sending (1070) the recommendation to the user. In some implementations, the item itself accompanies the recommendation (e.g., when the item will be played/used directly by a client device 102 rather than streamed).

As noted earlier, the entries $m_{ui}$ in the occurrence matrix 800 represent how many time user u interacted with item i. This is a large sparse matrix with potentially billions or trillions of entries. In some implementations the non-zero entries are about 0.01% (i.e., 1 out of every 10,000 entries).

Sample Implementation

Some implementations use the specific techniques illustrated below. It is convenient to denote the total number of user/item interactions by T, i.e. $T=\Sigma m_{ui}$. It is assumed that the latent vectors $\vec{u}$ 348 and $\vec{i}$ 350 are normally distributed (e.g., the vectors are drawn from a zero-mean spherical Gaussian distribution with variance $\sigma^2$). In particular, the exemplary model assumes that each (u, i) observation is drawn independently with replacement from the joint distribution U×I with probabilities as indicated in FIG. 9. In this case, P(u, i) denotes the probability of selecting the pair (u, i) if a random observation is picked from the full steam of log events.

The idea is to find the latent vectors $\vec{u}$ 348 and $\vec{i}$ 350 by finding a maximum a posteriori (MAP) estimate. Some implementations find the latent vectors that maximize the likelihood of the data in occurrence matrix 800, taking into account the prior estimates for the latent vectors as a form of regularization.

It is assumed that each observation (u, i) is independent, so multiplying all such probabilities and the prior probabilities yields a total likelihood L.

$$L = \prod_{u,i} P(u,i)^{m_{ui}} \prod_u N(u,\sigma^2) \prod_i N(i,\sigma^2)$$

The functions $N(u, \sigma^2)$ and $N(u, \sigma^2)$ are the normal distributions for the "prior" estimates (in the Bayesian sense). Computing the log of this quantity and computing the partial derivative with respect to each user vector $\vec{u}$ 348 yields:

$$\frac{\partial \log L}{\partial \vec{u}} = \sum_i m_{ui}\vec{i} - \frac{T}{Z}\sum_i \vec{i}\exp(\vec{u}\cdot\vec{i}) - \lambda u$$

In this expression, $\lambda$ is a constant. This becomes $$\frac{\partial \log L}{\partial \vec{u}} = x_u - \frac{T}{Z}y_u - \lambda u$$

Here, $x_u$ and $y_u$ are introduced to represent the sums. The term, $x_u$, can be calculated efficiently because only a small percentage of the coefficients $m_{ui}$ are non-zero. The second term includes $Z$, which can be written as a sum of contributions $Z_u$ from each user. $Z_u$ and $y_u$ cannot be computed efficiently because they involve summing over all items (e.g., millions). However, it is possible to estimate these parameters by sampling random items and extrapolating (e.g., sample 1000 of 5,000,000 items, then multiply the sum by 5000). As used herein, the symbol ^ over a variable or parameter indicates that it is computed by sampling (e.g., $\hat{y}$). While updating the latent user vectors $\vec{u}$, the algorithm can calculate $\hat{Z}_u$, and sum them up to obtain an estimation of $Z$. This $\hat{Z}$ can then be used in the next half-iteration. For the very first half-iteration, some implementations compute $\hat{Z} = \Sigma_{u,i} \exp(\vec{u}\cdot\vec{i})$ by taking a sampling of the initial user vectors and item vectors. If all of the initial latent vectors are near zero, then $\vec{u}\cdot\vec{i}$ is approximately 0, so $\exp(\vec{u}\cdot\vec{i}) \le 1$ for all the user and item vectors. In this case, a good estimate of $\hat{Z}$ for the first half-iteration is the number of elements in the occurrence matrix (i.e., the total number of users times the total number of items). In general, $\hat{Z}$ is computed in each half-iteration, and used during the subsequent half-iteration. The formulas above describe the first phase of each iteration, in which the item vectors are held constant. Analogous formulas apply during the second phase where the user vectors are held constant.

For efficiency, the analytic server 122 in some implementations splits the overall job into smaller tasks that are distributed to individual cluster servers 124. In some implementations there are several hundred cluster servers 124. To split the overall job, the analytic server 122 shards the users and items into smaller pieces. Typically there are hundreds or thousands of shards. The shards form a partition of the set of all user/item pairs. In general, sharding is "rectangular." (E.g., partition the set of users and partition the set of items; applying the two partitions simultaneously creates a partition of U×I into rectangular shards.) In some implementations where the user IDs and item IDs are numeric, the users are split into K groups and the items are split into L groups using modular arithmetic. In this case there are K times L shards. For example, one shard consists of all users with user ID mod K=0 and item ID mod L=0.

A cluster server 124 computes partial sums for one shard at a time. Later, the sums from the individual shards are combined. For example, some implementations use the following process:

Compute Partial Sums
    select/receive a shard S that consists of all user/item pairs where the user $u \in U_S$ and $i \in I_S$.
    for each $u \in U_S$
        calculate $x_{u,S} = \Sigma_{i \in I_S} m_{ui}\vec{i}$
        calculate $\hat{y}_{u,S} = \Sigma_{i \in I_S} \exp(\vec{u}\cdot\vec{i})\vec{i}$ by sampling random $i \in I_S$
        calculate $\hat{Z}_{u,S} = \Sigma_{i \in I_S} \vec{u}\cdot\vec{i}$ by sampling random $i \in I_S$ Combine Partial Sums and Adjust User Vectors
    for each u
        compute $x_u = \Sigma_S x_{u,S}$ for all shards S that contain u
        compute $\hat{y}_u = \Sigma_S \hat{y}_{u,S}$ for all shards S that contain u
        compute $\hat{Z}_u = \Sigma_S \hat{Z}_{u,S}$ for all shards S that contain u
        compute $$d_u = \frac{\partial \log L}{\partial \vec{u}} = x_u - \frac{T}{\hat{Z}}\hat{y}_u - \lambda u,$$

where $x_u$ and $\hat{y}_u$ have just been computed for u, and $\hat{Z}$ was computed in the previous half-iteration.
        update $u_{t+1} = u_t + \alpha_{u,t} d_u$, where $u_t$ is the user vector u after iteration t, $u_{t+1}$ is the user vector u after iteration t+1, and $\alpha_{u,t}$ is a scalar factor described below Compute $\hat{Z}$ for the next half iteration
    compute $\hat{Z} = \Sigma_u \hat{Z}_u$ This process has been described for the first phase of a single iteration, in which the item vectors are held constant, and the user vectors are updated. The same process is applied in the second phase, where the user vectors are held constant and the item vectors are updated. The second phase uses $\hat{Z}$ from the first phase calculation. Also, the $\hat{Z}$ computed in the second phase is used by the first phase of the next iteration.

There is a step size for each iteration. Typically, the step sizes get smaller, which guarantee convergence of the latent vectors. In some implementations, the values $\alpha_{u,t}$ are the same for all user and item vectors, and at step t the size is 1/t. Some implementations normalize the size of the gradient vector $d_u$ by using a step size of $$\frac{1}{t\|d_u\|}.$$

Some implementations compute a step size that takes into account the size of the gradients computed in previous steps. For example, some implementations use a step size of $$\alpha_{u,t} = \frac{1}{\sqrt{\sum_{1 \le s \le t} \|d_{u,s}\|^2}}$$

Some implementations use $$\alpha_{u,t} = \frac{0.4}{\sqrt[4]{t}}$$

As illustrated, the step sizes can be selected in various ways based on experimental results as well as resource constraints.

Some implementations modify this basic process. One reason users do not listen to a certain audio track (or interact with a content item in general) is that they do not know about the item. Because of this, having $m_{ui}=0$ may not be a clear negative signal. In fact, having $m_{ui}=1$ may be a better indicator: the user is aware of the item, but has not returned to the item again. (This is probably most relevant for repeat content items, such as audio tracks or video games). To address this issue, some implementations utilize only the occurrence matrix entries that are positive. Instead of calculating Z and $y_u$, the model calculates $Z^+$ and $y^+$ which compute sums over items for which $m_{ui}>0$. Because the sums are computed over a much smaller set, they are typically computed exactly rather than using sampling.

A hybrid approach is to combine the two methods with appropriate weights selected for each. For example, let β be the weight for the original method, with 0<β<1. Then the weight for the second method is 1−β. In the second method, the probabilities are positive only for the (u, i) pairs with $m_{ui}>0$, and the probability is $$P^+(u, i) = \frac{1}{Z^+}\exp(\vec{u}\cdot\vec{i}).$$

With this definition, it follows that $Z^+=\exp(\vec{u}\cdot\vec{i})$.

In this case, we have $$\frac{\partial \log L}{\partial \vec{u}} = x_u - \beta\frac{T}{Z}y_u - (1-\beta)\frac{T}{Z^+}y_u^+ - \lambda u$$

The computations for each iteration are updated accordingly. Setting β=1 yields the first model as described previously above. Setting β=0 uses entirely the second method. Based on empirical analysis, this does not produce optimal results. Setting β=½ produces fairly good results.

Some implementations modify the basic process in a different way, using probability distributions for each individual user. For a user u, the probability that the user selects item i is given by $P(i|u)=\exp(\vec{u}\cdot\vec{i})/Z_u$, where $Z_u=\Sigma_i \exp(\vec{u}\cdot\vec{i})$. Also, $T_u$ is the total number of item interactions for user u, so $T_u=\Sigma_i m_{ui}$. With this change, the gradient of log L is $$\frac{\partial \log L}{\partial \vec{u}} = x_u - \beta\frac{T_u}{Z_u}y_u - (1-\beta)\frac{T_u}{Z_u^+}y_u^+ - \lambda u$$

The calculations are updated accordingly.

Some implementations for audio tracks use another variant that models co-occurrences of tracks. The algorithm evaluates pairs of tracks i, j in playlists where i immediately precedes j. The model estimates the conditional likelihood of j occurring after i by assuming P(j|i) is proportional to $\vec{i}\cdot\vec{j}$. This model uses an occurrence matrix M with entries $m_{ij}$ indicating the number of times that item i immediately precedes j in a playlist. The gradient $$\frac{\partial \log L}{\partial \vec{i}}$$

of the log likelihood function is $$\sum_j (m_{ij}+m_{ji})\vec{i} - \left(\frac{T_i}{Z_i}+\frac{T_j}{Z_j}\right)\exp(\vec{i}\cdot\vec{j})\vec{j} - \lambda\vec{i}$$

This model provides only latent item vectors, and thus each iteration of the algorithm has only a single phase.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method performed at one or more servers, each having one or more processors and memory, the method comprising:
retrieving a two-dimensional matrix of data points, a first dimension of the matrix corresponding to a group of users, a second dimension of the matrix corresponding to a group of identifiers, each data point representing a count of occurrences of a respective user selecting a respective item, wherein each user corresponds to a user identifier in a set of user identifiers and each item corresponds to an item identifier in a set of item identifiers;
initializing a respective user vector for each user identifier in the set of user identifiers, wherein the respective user vector has n component values, n being a positive integer, and wherein initializing the respective user vector includes initializing the n component values of the respective user vector;
initializing a respective item vector for each item identifier in the set of item identifiers, wherein the respective item vector has n component values, and wherein initializing the respective item vector includes initializing the n component values of the respective item vector;
iteratively adjusting the user vectors and item vectors based on the data points in the two dimensional matrix, wherein the adjusting comprises, for each iteration:
performing a first phase in which the component values of the item vectors are held constant, including:
computing a plurality of first phase parameters for each user vector based on data in the two-dimensional matrix, the user vectors, and the item vectors, wherein the plurality of first phase parameters for each user vector u includes n component values of a gradient vector $d_u$, wherein $d_u$ specifies the direction to modify u in order to optimize the user vector u; and
replacing each user vector u with $u+\alpha(d_u/|d_u|)$, where α is a monotonically decreasing function of the iteration and $|d_u|$ is the length of the vector $d_u$; and
performing a second phase in which the component values of the user vectors are held constant, including:
computing a plurality of second phase parameters for each item vector based on data in the two-dimensional matrix, the user vectors, and the item vectors, wherein the plurality of second phase parameters for each item vector i includes n component values of a respective gradient vector $h_i$, wherein $h_i$ specifies the direction to modify i in order to optimize the item vector i; and replacing each item vector i with $i+\beta(h_i/|h_i|)$, where $\beta$ is a monotonically decreasing function of the iteration and $|h_i|$ is the length of the vector $h_i$;

receiving a request from a user for an item recommendation;

selecting an item for the user based, at least in part, on the adjusted user vectors and item vectors; and recommending the selected item to the user.

2. The method of claim 1, wherein selecting the item for the user includes estimating a probability of user selection using $\exp(u_0 \cdot i_0)$, wherein $u_0$ is the user vector corresponding to the user and $i_0$ is the item vector corresponding to the selected item.

3. The method of claim 1, wherein computing the plurality of first phase parameters further comprises:
sharding the set of user identifiers and the set of item identifiers into a plurality of non-overlapping shards;
computing partial first phase parameters for each of the plurality of shards; and
computing at least a subset of the first phase parameters by summing corresponding partial first phase parameters.

4. The method of claim 1, wherein computing the plurality of first phase parameters further comprises:
computing a sampled first phase parameter using data from a proper subset of the item vectors; and
estimating a first phase parameter corresponding to the sampled first phase parameter by multiplying the sampled first phase parameter by a scaling factor corresponding to the fraction of item vectors sampled.

5. The method of claim 1, wherein each item is an audio track.

6. The method of claim 1, wherein the user corresponds to a user vector $u_0$, selecting an item for the user comprises selecting an item vector $i_0$ for which the inner product of $u_0$ and $i_0$ is greater than the inner product of $u_0$ and i for most of the item vectors i, and the selected item corresponds to the item vector $i_0$.

7. The method of claim 1, wherein the user likes the item corresponding to item vector $i_1$, and selecting an item for the user comprises selecting an item vector $i_0$ for which the inner product of $i_0$ and $i_1$ is greater than the inner product of $i_0$ and i for most of the item vectors i, and the selected item corresponds to the item vector $i_0$.

8. The method of claim 1, further comprising, prior to initializing the respective user vector for each user identifier in the set of user identifiers:
selecting the positive integer n.

9. The method of claim 1, further comprising:
allocating memory for the respective user vector for each user identifier in the set of user identifiers; and
allocating memory for the respective item vector for each item identifier in the set of item identifiers.

10. A computer system for selecting content items, comprising:
one or more processors; and
memory storing one or more programs configured for execution by the one or more processors, the one or more programs comprising instructions for:
retrieving a two-dimensional matrix of data points, a first dimension of the matrix corresponding to a group of users, a second dimension of the matrix corresponding to a group of identifiers, each data point representing a count of occurrences of a respective user selecting a respective item, wherein each user corresponds to a user identifier in a set of user identifiers and each item corresponds to an item identifier in a set of item identifiers;
initializing a respective user vector for each user identifier in the set of user identifiers, wherein the respective user vector has n component values, n being a positive integer, and wherein initializing the respective user vector includes initializing the n component values of the respective user vector;
initializing a respective item vector for each item identifier in the set of item identifiers, wherein the respective item vector has n component values, and wherein initializing the respective item vector includes initializing the n component values of the respective item vector;
iteratively adjusting the user vectors and item vectors based on the data points in the two dimensional matrix, wherein the adjusting comprises, for each iteration:
performing a first phase in which the component values of the item vectors are held constant, including:
computing a plurality of first phase parameters for each user vector based on data in the two-dimensional matrix, the user vectors, and the item vectors, wherein the plurality of first phase parameters for each user vector u includes n component values of a gradient vector $d_u$, wherein $d_u$ specifies the direction to modify u in order to optimize the user vector u; and
replacing each user vector u with $u+\alpha(d_u/|d_u|)$, where $\alpha$ is a monotonically decreasing function of the iteration and $|d_u|$ is the length of the vector $d_u$; and
performing a second phase in which the component values of the user vectors are held constant, including:
computing a plurality of second phase parameters for each item vector based on data in the two-dimensional matrix, the user vectors, and the item vectors, wherein the plurality of second phase parameters for each item vector i includes n component values of a respective gradient vector $h_i$, wherein $h_i$ specifies the direction to modify i in order to optimize the item vector i; and
replacing each item vector i with $i+\beta(h_i/|h_i|)$, where $\beta$ is a monotonically decreasing function of the iteration and $|h_i|$ is the length of the vector $h_i$;
receiving a request from a user for an item recommendation;
selecting an item for the user based, at least in part, on the adjusted user vectors and item vectors; and
recommending the selected item to the user.

11. The computer system of claim 10, wherein the instructions for selecting the item for the user comprise instructions for estimating a probability of user selection using $\exp(u_0 \cdot i_0)$, wherein $u_0$ is the user vector corresponding to the user and $i_0$ is the item vector corresponding to the selected item.

12. The computer system of claim 10, wherein the instructions for computing the plurality of first phase parameters further comprise instructions for:
sharding the set of user identifiers and the set of item identifiers into a plurality of non-overlapping shards;
computing partial first phase parameters for each of the plurality of shards; and
computing at least a subset of the first phase parameters by summing corresponding partial first phase parameters.

13. The computer system of claim 10, wherein the instructions for computing the plurality of first phase parameters further comprise instructions for:

computing a sampled first phase parameter using data from a proper subset of the item vectors; and estimating a first phase parameter corresponding to the sampled first phase parameter by multiplying the sampled first phase parameter by a scaling factor corresponding to the fraction of item vectors sampled.

14. The computer system of claim 10, wherein the user corresponds to a user vector $u_0$, the instructions for selecting an item for the user comprise instructions for selecting an item vector $i_0$ for which the inner product of $u_0$ and $i_0$ is greater than the inner product of $u_0$ and i for most of the item vectors i, and the selected item corresponds to the item vector $i_0$.

15. The computer system of claim 10, wherein the user likes the item corresponding to item vector $i_1$, the instructions for selecting an item for the user comprise instructions for selecting an item vector $i_0$ for which the inner product of $i_0$ and $i_1$ is greater than the inner product of $i_0$ and i for most of the item vectors i, and the selected item corresponds to the item vector $i_0$.

16. A non-transitory computer readable storage medium storing one or more programs configured for execution by one or more processors of a computer system to select content items, the one or more programs comprising instructions for:

retrieving a two-dimensional matrix of data points, a first dimension of the matrix corresponding to a group of users, a second dimension of the matrix corresponding to a group of identifiers, each data point representing a count of occurrences of a respective user selecting a respective item, wherein each user corresponds to a user identifier in a set of user identifiers and each item corresponds to an item identifier in a set of item identifiers;

initializing a respective user vector for each user identifier in the set of user identifiers, wherein the respective user vector has n component values, n being a positive integer, and wherein initializing the respective user vector includes initializing the n component values of the respective user vector;

initializing a respective item vector for each item identifier in the set of item identifiers, wherein the respective item vector has n component values, and wherein initializing the respective item vector includes initializing the n component values of the respective item vector;

iteratively adjusting the user vectors and item vectors based on the data points in the two dimensional matrix, wherein the adjusting comprises, for each iteration:

performing a first phase in which the component values of the item vectors are held constant, including:

computing a plurality of first phase parameters for each user vector based on data in the two-dimensional matrix, the user vectors, and the item vectors, wherein the plurality of first phase parameters for each user vector u includes n component values of a gradient vector $d_u$, wherein $d_u$ specifies the direction to modify u in order to optimize the user vector u; and replacing each user vector u with $u+\alpha(d_u/|d_u|)$, where $\alpha$ is a monotonically decreasing function of the iteration and $|d_u|$ is the length of the vector $d_u$; and performing a second phase in which the component values of the user vectors are held constant, including:

computing a plurality of second phase parameters for each item vector based on data in the two-dimensional matrix, the user vectors, and the item vectors, wherein the plurality of second phase parameters for each item vector i includes n component values of a respective gradient vector $h_i$, wherein $h_i$ specifies the direction to modify i in order to optimize the item vector i; and replacing each item i with $i+\beta(h_i/|h_i|)$, where $\beta$ is a monotonically decreasing function of the iteration and $|h_i|$ is the length of the vector $h_i$;

receiving a request from a user for an item recommendation;

selecting an item for the user based, at least in part, on the adjusted user vectors and item vectors; and recommending the selected item to the user.

\* \* \* \* \*